United States Patent
Mohammad Soleymani et al.

(10) Patent No.: US 12,382,430 B2
(45) Date of Patent: Aug. 5, 2025

(54) NR SIDELINK CONTROL MESSAGE DESIGN

(71) Applicant: Fraunhofer-Gesellschaft zur Förderung der angewandten Forschung e.V., Munich (DE)

(72) Inventors: Dariush Mohammad Soleymani, Erlangen (DE); Khaled Shawky Hassan Hussein, Erlangen (DE); Elke Roth-Mandutz, Erlangen (DE); Shubhangi Bhadauria, Erlangen (DE); Martin Leyh, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 414 days.

(21) Appl. No.: 17/666,040

(22) Filed: Feb. 7, 2022

(65) Prior Publication Data
US 2022/0225292 A1     Jul. 14, 2022

Related U.S. Application Data

(63) Continuation of application No. PCT/EP2020/072388, filed on Aug. 10, 2020.

(30) Foreign Application Priority Data

Aug. 14, 2019   (EP) .................... 19191838

(51) Int. Cl.
*H04W 4/00*     (2018.01)
*H04L 1/00*     (2006.01)
(Continued)

(52) U.S. Cl.
CPC .......... *H04W 72/02* (2013.01); *H04L 1/0038* (2013.01); *H04L 1/08* (2013.01); *H04W 72/0446* (2013.01);
(Continued)

(58) Field of Classification Search
None
See application file for complete search history.

(56) References Cited

U.S. PATENT DOCUMENTS

| | | |
|---|---|---|
| 2019/0173612 A1 | 6/2019 | Kimura et al. |
| 2019/0182840 A1 | 6/2019 | Feng et al. |
| (Continued) | | |

FOREIGN PATENT DOCUMENTS

| | | |
|---|---|---|
| CN | 109588057 A | 4/2019 |
| CN | 109792721 A | 5/2019 |
| (Continued) | | |

OTHER PUBLICATIONS

3GPP TSG RAN WG1 #97, "Chairman's Notes 3GPP TSG RAN WG1 #97 v1.0.0", May 13-17, 2019, Reno, US.
(Continued)

*Primary Examiner* — Zewdu A Beyen
(74) *Attorney, Agent, or Firm* — NKL LAW; Jae Youn Kim

(57) ABSTRACT

A user device, UE, for a wireless communication system, is connected to one or more further UEs in the wireless communication system for a sidelink communication with the one or more further UEs. The sidelink communication include one or more sidelink control messages, e.g., a Sidelink Control Information, SCI, to be transmitted on sidelink resources. The UE identifies a sidelink control message for the UE by blind decoding, and decodes the sidelink control message for the UE to derive control information embedded the sidelink control message. The UE is pre-configured or configured by a network or a base-station with a sidelink, SL, search space, e.g., a SL-CORE-SET or SL control channel occasions, in the sidelink resources. The sidelink search space includes one or more
(Continued)

search occasions where the UE is to perform the blind decoding on the sidelink resources.

13 Claims, 19 Drawing Sheets

(51) Int. Cl.
  *H04L 1/08* (2006.01)
  *H04W 72/02* (2009.01)
  *H04W 72/0446* (2023.01)
  *H04W 72/0453* (2023.01)
  *H04W 72/20* (2023.01)
(52) U.S. Cl.
  CPC ....... *H04W 72/0453* (2013.01); *H04W 72/20* (2023.01)

(56) References Cited

U.S. PATENT DOCUMENTS

2020/0084754 A1   3/2020  Tsai et al.
2020/0305174 A1*  9/2020  Ganesan ............... H04W 4/029

FOREIGN PATENT DOCUMENTS

WO       2018145019 A1    8/2018
WO       2018/228527 A1   12/2018

OTHER PUBLICATIONS

3GPP TR 38.885, "Technical Specification Group Radio Access Network; NR; Study on NR Vehicle-to-Everything (V2X)", V16.0.0, Mar. 2019.
3GPP TDOC R1-1907924, "Feature lead summary#4 for 7.2.4.1 Physical layer structure for sidelink", Samsung, 3GPP RAN1#97, May 13-17, 2019, Reno, US.
3GPP TDOC RP-190984, "Revised WID on 5G V2X with NR sidelink", LG Electronics, Huawei, 3GPP RAN#84, Jun. 3-6, 2019, Newport Beach, US.
3GPP TS 136.213, "Evolved Universal Terrestrial Radio Access (E-UTRA); Physical layer procedures(Release 15)", V15.6.0, Jul. 2019.
3GPP TS 136.211, "Evolved Universal Terrestrial Radio Access (E-UTRA); Physical channels and modulation(Release 15)", V15.6.0, Jul. 2019.
3GPP TS 23.303, "Technical Specification Group Services and System Aspects; Proximity-based services (ProSe); Stage 2", V15.0.0, Jun. 2017.
LTE—Advanced pro standard.
5G or NR, New Radio standard.
IEEE 802.11p standard.
IEEE 802.15.4 standard (Zigbee).
Ericsson, "Details on physical layer structure for SL V2X", 3GPP draft, R1-1901211, vol. RAN WG1, Jan. 21-25, 2019, XP051576740, Taipei, Taiwan.
Ericsson, "On 2-stage PSCCH design", 3GPP draft, R1-1813648, vol. RAN WG1, Nov. 12-16, 2018, XP051479989, Spokane, WA, US.
Nokia et al, "Discussion of physical layer structure for sidelink", 3GPP draft, R1-1906074, May 13-17, 2019, XP051727531, Reno, US.
Interdigital et al., "Discussion on Physical Layer Structure for NR V2X Sidelink", 3GPP draft, R1-1907091, vol. RAN WG1, May 13-17, 2019, XP051728537, Reno, US.
Fraunhofer HHI et al., "Design of NR V2X Physical Layer Structures", 3GPP draft, R1-1908677, vol. RAN WG1, Aug. 16-30, 2019, XP051765285, Prague, CZ.
C. Praveen Daniel, "Office Action for IN Application No. 202227007725", Sep. 2, 2022, Intellectual Property India, India.
Lenovo, Motorola Mobility, "Sidelink Physical layer structures in NRV2X" [online], 3GPP TSG RAN WG1 #97 R1-1906267, Internet <URL:https://www.3gpp.org/ftp/tsg_ran/WG1_RL1/TSGR1_97/Docs/R1-1906267.zip>, May 17, 2019.
Huawei, HiSilicon, "Design and contents of PSCCH and PSFCH" [online], 3GPP TSG RAN WG1 #97 R1-1906596, Internet <URL:https://www.3gpp.org/ftp/tsg_ran/WG1_RL1/TSGR1_97/Docs/R1-1906596.zip>, May 17, 2019.
Fraunhofer HHI, Fraunhofer IIS, "Design of NR V2X Physical Layer Structures" [online], 3GPP TSG RAN WG1 #97 R1-1906649, Internet <URL:https://www.3gpp.org/ftp/tsg_ran/WG1_RL1/TSGR1_97/Docs/R1-1906649.zip>, May 17, 2019.
NTT DOCOMO, Inc., "NR Sidelink Physical Layer Structure" [online], 3GPP TSG RAN WG1 #97 R1-1906205, Internet <URL:https://www.3gpp.org/ftp/tsg_ran/WG1_RL1/TSGR1_97/Docs/R1-1906205.zip>, May 17, 2019.
Ericsson, "Remaining details on physical structure for NR SL" [online], 3GPP TSG RAN WG1 #96 R1-1903163, Internet <URL:https://www.3gpp.org/ftp/tsg_ran/WG1_RL1/TSGR1_96/Docs/R1-1903163.zip>, Mar. 1, 2019.
Panasonic, "Discussion on sidelink resource allocation in mode 1 for NR V2X" [online], 3GPP TSG RAN WG1 #96 R1-1902204, Internet <URL:http://www.3gpp.org/ftp/tsg_ran/WG1_RL1/TSGR1_96/Docs/R1-1902204.zip>, Mar. 1, 2019.
Chinese Patent Office, First Office Opinion Notice for Chinese Patent Application No. 202080071487.6, Sep. 23, 2024.
Lenovo et al., R1-1806351, Discussion on Pool sharing for V2X Phase 2, 3GPP TSG RAN WG1 #93, 3GPP server release date (May 11, 2018).
ZTE et al., RP-190216, Discussion on working scope of V2X, 3GPP TSG RAN #83, 3GPP server release date (Mar. 11, 2019).
Chinese Patent Office, Second Office Opinion Notice for Chinese Patent Application No. 202080071487.6, May 15, 2025.

* cited by examiner

```
SL-SearchSpace ::=                          SEQUENCE {
    SL-searchSpaceID                        SL-SearchSpaceID, SL-monitoringSlotPeriodicityAndOffset       CHOICE {
    s11
    s12
    s14
...// (for example every sympol, every next symbol, so on.)
SL-monitoringfrequency subchannel_offset    CHOICE {
    Subchannel1
    Subchannel2
Subchannel
// (for example every subchannel, every next subchanne, so on.; suchannel measured from subchannel 0 or other loaction)
}
SL-monitoringfrequency subchannel_length    CHOICE {
    Subchannel1
    Subchannel2
Subchannel
// (for example every subchannel, 1-subchanne long, 2-suchannel long, and so on.)
}

SL-monitoringSymbolsWithinSlot          (if mini-slot is supported)
...
SL-searchSpaceType
Common
{
    SCI-1st_format_i_i
    SCI-1st_format_i_j
    SCI-1st_format_j_i
    SCI-1st_format_j_j
    ...
    ...
//specify all format according to the number of symbols
}
SL-searchSpaceType
UE_specific
{
    SCI-1st_format_i_i
    SCI-1st_format_i_j
    SCI-1st_format_j_i
    SCI-1st_format_j_j
    ...
    ...
//specify all format according to the number of symbols
}
```

Fig. 6

```
ue-Specific SEQUENCE {
    sci-1st-Formats_UE-specific
```

Fig. 7

```
-- ASN1START
-- TAG-PSCCH-CONFIGCOMMON-START

PSCCH-ConfigCommon ::=          SEQUENCE {

PSCCH_type ::= {
    First-stage-SCI
}
1st_stage_PSCCH-formatConfigCommon ::=     SEQUENCE {
    SL-controlResourceSetZero            ControlResourceSetZero       OPTIONAL,    -- Cond Common SL BWP-Only
    SL-commonControlResourceSet          ControlResourceSet           OPTIONAL,    -- Need R
    SL-searchSpaceZero                   SearchSpaceZero              OPTIONAL,    -- Cond Common SL BWP-Only
    SL-commonSearchSpaceList             SEQUENCE (SIZE (1..4)) OF SearchSpace   OPTIONAL,   -- Need R
    SL-searchSpaceSIB1                   SearchSpaceId                              OPTIONAL,  -- Need S
                                                                                Optional for boradcast
    SL-dmrs_control_type_1                                                      Optional for unicast/groupcast
    SL-dmrs_control_type_2_1                                                    Optional for unicast/groupcast
    SL-dmrs_control_type_2_2
    ……
    {
    firstPSCCH-MonitoringOccasionOfPO   CHOICE {
        sCS15KHZoneT        SEQUENCE (SIZE (1..maxPO-perPF)) OF INTEGER (0..139),
        sCS30KHZoneT        SEQUENCE (SIZE (1..maxPO-perPF)) OF INTEGER (0..xxxxx),
        sCS60KHZoneT-       SEQUENCE (SIZE (1..maxPO-perPF)) OF INTEGER (xxxxx),
        sCS120KHZoneT       SEQUENCE (SIZE (1..maxPO-perPF)) OF INTEGER (0..1119),
    }}
    ……
}
-- TAG-PSCCH-CONFIGCOMMON-STOP
-- ASN1STOP
```

Fig. 15

```
-- ASN1START
-- TAG-PSCCH-CONFIGCOMMON-START

PSCCH-ConfigCommon ::=    SEQUENCE {

PSCCH_type ::= {
    First-stage-SCI
}
1st_stage_PSCCH-formatConfig, ::=    SEQUENCE {

SL-controlResourceSetToAddModList      SEQUENCE (SIZE (1..3)) OF ControlResourceSet      OPTIONAL,    -- Need N
    SL-controlResourceSetToReleaseList     SEQUENCE (SIZE (1..3)) OF ControlResourceSet Id   OPTIONAL,    -- Need N
    SL-searchSpacesToAddModList            SEQUENCE (SIZE (1..10)) OF SearchSpace            OPTIONAL,    -- Need N
    SL-searchSpaceToReleaseList            SEQUENCE (SIZE (1..10)) OF SearchSpaceId          OPTIONAL,    -- Need N
    SL-dmrs_control_type_1                                                                   Optional for boradcast
    SL-dmrs_control_type_2_1                                                                 Optional for unicast/groupcast
    SL-dmrs_control_type_2_1
    SL-dmrs_control_type_2_1
    ....
    SL-searchSpace_UE_specific             SearchSpaceId (for UE specific)                   OPTIONAL,    -- Need S
    SL-dmrs_control_type_1                                                                   Optional for boradcast
    SL-dmrs_control_type_2_1                                                                 Optional for unicast/groupcast
    SL-dmrs_control_type_2_1                                                                 Optional for unicast/groupcast
    SL-dmrs_control_type_2_1
    interslotFrequencyHopping              ENUMERATED (enabled)                              OPTIONAL,    -- Need R
    additionalV2XDMRS                      ENUMERATED (true)                                 OPTIONAL,    -- Need R
    ......
}
}

-- TAG-PSCCH-CONFIGCOMMON-STOP
-- ASN1STOP
```

Fig. 16

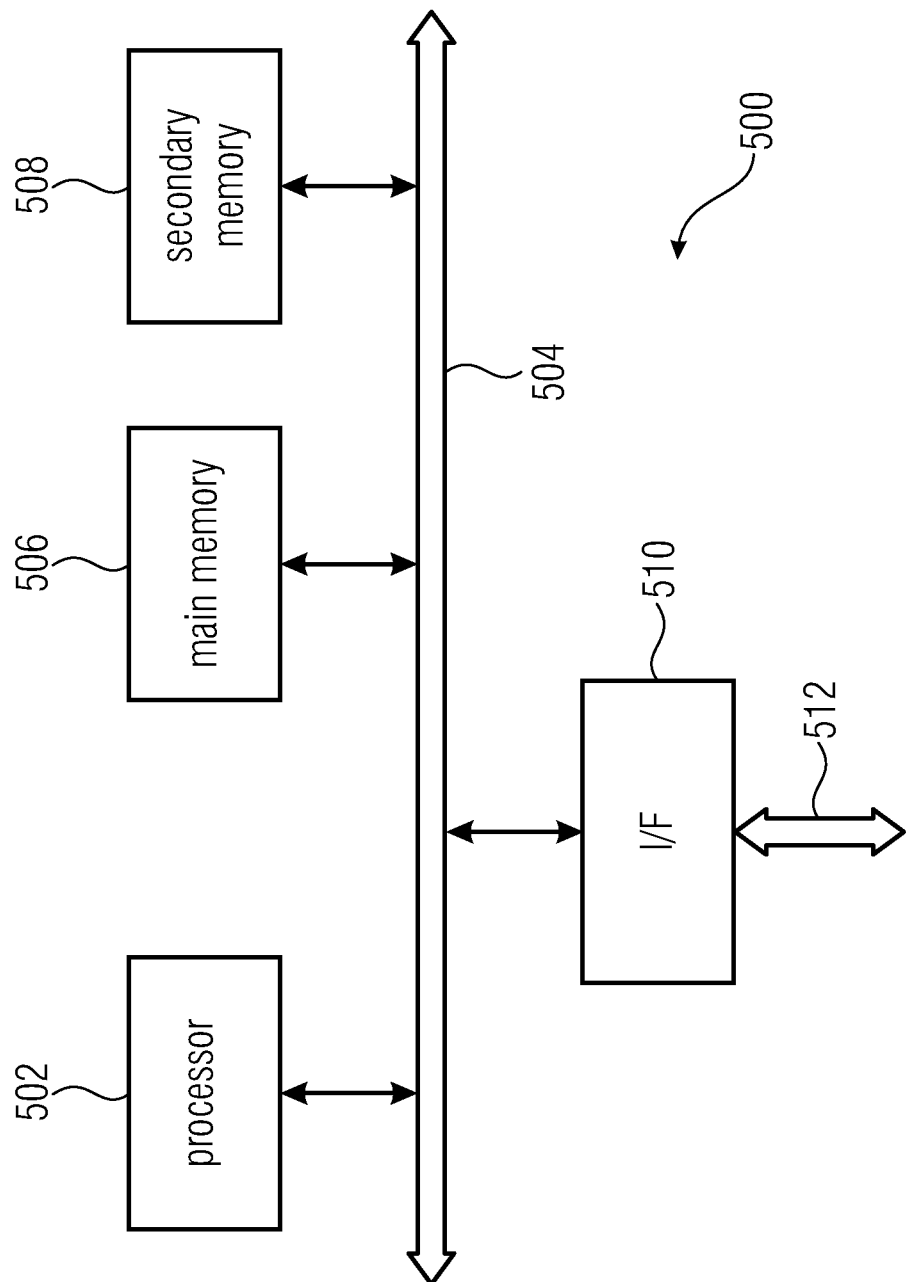

NR SIDELINK CONTROL MESSAGE DESIGN

CROSS-REFERENCE TO RELATED APPLICATIONS

This application is a continuation of copending International Application No. PCT/EP2020/072388, filed Aug. 10, 2020, which is incorporated herein by reference in its entirety, and additionally claims priority from European Application No. EP 19191838.2, filed Aug. 14, 2019, which is also incorporated herein by reference in its entirety.

The present application concerns the field of wireless communication systems and networks, more specifically the direct communication among network entities, like user devices, in such wireless communication systems or networks using a sidelink communication. Embodiments of the present invention concern improvements/enhancements of a two-stage SCI, sidelink control information.

BACKGROUND OF THE INVENTION

FIG. 1 is a schematic representation of an example of a terrestrial wireless network 100 including, as is shown in FIG. 1(a), a core network 102 and one or more radio access networks $RAN_1$, $RAN_2$, .... $RAN_N$. FIG. 1(b) is a schematic representation of an example of a radio access network RANn that may include one or more base stations $gNB_1$ to $gNB_5$, each serving a specific area surrounding the base station schematically represented by respective cells $106_1$ to $106_5$. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the $RAN_n$ may include more or less such cells, and $RAN_n$ may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and UEs to the base stations $gNB_2$, $gNB_4$ or for transmitting data from the base stations $gNB_2$, $gNB_4$ to the users $UE_1$, $UE_2$, $UE_3$. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user UEs as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. Further, some or all of the respective base station $gNB_1$ to $gNB_5$ may connected, e.g. via the S1 or X2 interface or the XN interface in NR, with each other via respective backhaul links $116_1$ to $116_5$, which are schematically represented in FIG. 1(b) by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and a system information block (SIB), the physical downlink, uplink and sidelink control channels (PDCCH, PUCCH, PSSCH) carrying for example the downlink control information (DCI), the uplink control information (UCI) and the sidelink control information (SCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

The wireless network or communication system depicted in FIG. 1 may by a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs may not be connected to a base station, for example, they are not in an RRC connected state, so that the UEs do not receive from the base station any sidelink resource allocation configuration or assistance, and/or may be connected to the base station, but, for one or more reasons, the base station may not provide sidelink resource allocation configuration or assistance for the UEs, and/or may be connected to the base station that may not support NR V2X services, e.g. GSM, UMTS, LTE base stations.

When considering two UEs directly communicating with each other over the sidelink, e.g. using the PC5 interface, one of the UEs may also be connected with a BS, and may relay information from the BS to the other UE via the sidelink interface. The relaying may be performed in the same frequency band (in-band-relay) or another frequency band (out-of-band relay) may be used. In the first case, communication on the Uu and on the sidelink may be decoupled using different time slots as in time division duplex, TDD, systems.

FIG. 2 is a schematic representation of an in-coverage scenario in which two UEs directly communicating with each other are both connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a mode 1 configuration in NR V2X or as a mode 3 configuration in LTE V2X.

FIG. 3 is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is the out-of-coverage scenario does not necessarily mean that the respective mode 2 UEs (in NR) or mode 4 UEs (in LTE) are outside of the coverage 200 of a base station, rather, it means that the respective mode 2 UEs (in NR) or mode 4 UEs (in LTE) are not served by a base station, are not connected to the base station of the coverage area, or are connected to the base station but receive no SL resource allocation configuration or assistance from the base station. Thus, there may be situations in which, within the coverage area 200 shown in FIG. 2, in addition to the NR mode 1 or LTE mode 3 UEs 202, 204 also NR mode 2 or LTE mode 4 UEs 206, 208, 210 are present.

In the above-described scenarios of vehicular user devices, UEs, a plurality of such user devices may form a user device group, also referred to simply as group, and the communication within the group or among the group members may be performed via the sidelink interfaces between the user devices, like the PC5 interface. For example, the above-described scenarios using vehicular user devices may be employed in the field of the transport industry in which a plurality of vehicles being equipped with vehicular user devices may be grouped together, for example, by a remote driving application. Other use cases in which a plurality of user devices may be grouped together for a sidelink communication among each other include, for example, factory automation and electrical power distribution. In the case of factory automation, a plurality of mobile or stationary machines within a factory may be equipped with user devices and grouped together for a sidelink communication, for example for controlling the operation of the machine, like a motion control of a robot. In the case of electrical power distribution, entities within the power distribution grid may be equipped with respective user devices which, within a certain area of the system may be grouped together so as to communicate via a sidelink communication with each other so as to allow for monitoring the system and for dealing with power distribution grid failures and outages.

Naturally, in the above-mentioned use cases sidelink communication is not limited to a communication within a group. Rather, the sidelink communication may be among any of UEs, like any pair of UEs.

It is noted that the information in the above section is only for enhancing the understanding of the background of the invention and therefore it may contain information that does not form conventional technology that is already known to a person of ordinary skill in the art.

SUMMARY

An embodiment may have a user device, UE, for a wireless communication system, wherein the UE is to be connected to one or more further UEs in the wireless communication system for a sidelink communication with the one or more further UEs, the sidelink communication including one or more sidelink control messages, e.g., a Sidelink Control Information, SCI, to be transmitted on sidelink resources, the UE is to identify the sidelink control message for the UE, the UE is to decode the sidelink control message for the UE to derive control information embedded the sidelink control message, the information embedded in the sidelink control message indicates a configuration of a further message, the further message including further control information and/or data, the information embedded in the sidelink control message indicates a periodicity of transmissions of the sidelink message and/or the further message, and a predefined value for the periodicity signals either a single shot transmission of the sidelink control message and/or the further message without any periodicity or a release of a previous periodicity.

Another embodiment may have a network entity for a wireless communication system, the wireless communication including one or more UEs to be connected to one or more further UEs for a sidelink communication with the one or more further UEs, the sidelink communication including one or more sidelink control messages, e.g., Sidelink Control Information, SCI, to be transmitted on sidelink resources, wherein the network entity is to signal to a receiving UE or a group of receiving UEs a sidelink control message, wherein information embedded in the sidelink control message indicates a configuration of a further message, the further message including further control information and/or data, the information embedded in the sidelink control message indicates a periodicity of transmissions of the sidelink message and/or the further message, and a predefined value for the periodicity signals either a single shot transmission of the sidelink control message and/or the further message without any periodicity or a release of a previous periodicity.

According to another embodiment, a wireless communication system may have an inventive a user device or a network entity for a wireless communication system or an inventive network entity for a wireless communication system, According to another embodiment, a method for a wireless communication system may have the steps of: connecting a UE to one or more further UEs in the wireless communication system for a sidelink communication with the one or more further UEs, the sidelink communication including one or more sidelink control messages, e.g., a Sidelink Control Information, SCI, to be transmitted on sidelink resources, identifying, by the UE, a sidelink control message for the UE by blind decoding, and decoding, by the UE, the sidelink control message for the UE to derive control information embedded the sidelink control message, wherein the information embedded in the sidelink control message indicates a configuration of a further message, the further message including further control information and/or data, wherein the information embedded in the sidelink control message indicates a periodicity of transmissions of the sidelink message and/or the further message, and wherein a predefined value for the periodicity signals either a single shot transmission of the sidelink control message and/or the further message without any periodicity or a release of a previous periodicity.

According to another embodiment, a method for a wireless communication system, the wireless communication including one or more UEs to be connected to one or more further UEs for a sidelink communication with the one or more further UEs, the sidelink communication including one or more sidelink control messages, e.g., Sidelink Control Information, SCI, to be transmitted on sidelink resources, may have the steps of: signaling, by a network entity, to a receiving UE or a group of receiving UEs a sidelink control message, wherein information embedded in the sidelink control message indicates a configuration of a further message, the further message including further control information and/or data, wherein the information embedded in the sidelink control message indicates a periodicity of transmissions of the sidelink message and/or the further message, and wherein a predefined value for the periodicity signals either a single shot transmission of the sidelink control message and/or the further message without any periodicity or a release of a previous periodicity.

Another embodiment may have a non-transitory digital storage medium having a computer program stored thereon to perform any of the inventive methods when said computer program is run by a computer.

BRIEF DESCRIPTION OF THE DRAWINGS

Embodiments of the present invention will be detailed subsequently referring to the appended drawings, in which:

FIG. 6 illustrates an embodiment of a SL-search space information element that may be used for configuring sidelink UEs with the common search space and that may be signaled in a SIB;

FIG. 7 illustrates an embodiment a UE-specific search space information element having a search space type ue-specific;

FIG. 15 illustrates an embodiment for a PSCCH-config-common information element;

FIG. 16 illustrates an embodiment of a PSCCH-config-UE specific information element;

FIG. 21 illustrates an example of a computer system on which units or modules as well as the steps of the methods described in accordance with the inventive approach may execute.

DETAILED DESCRIPTION OF THE INVENTION

Figure 1A:
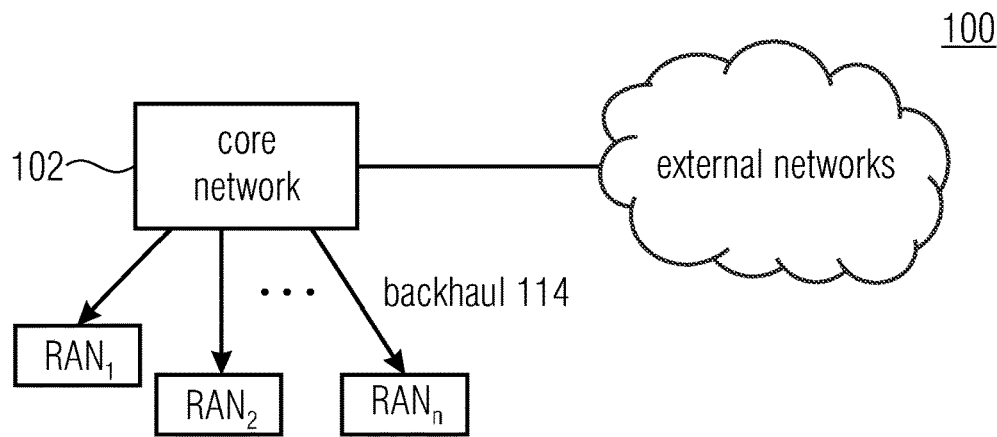
FIGS. 1(a) and 1(b) show a schematic representation of an example of a wireless communication system.

Embodiments of the present invention are now described in more detail with reference to the accompanying drawings in which the same or similar elements have the same reference signs assigned.

In the above-described wireless communication systems or networks, a sidelink communication among respective network entities may be performed, and such a sidelink communication includes the transmission of control information using respective sidelink control messages, also referred to as sidelink control information, SCI. The SCI in LTE contains information about the time-frequency resources to be used for a data transmission, also referred to as a PSSCH transmission. For example, the resource blocks or the resource pools are specified, i.e., the set of resources on which the PSSCH is transmitted. In LTE, the SCI is transmitted in the PSCCH, for example, with every PSSCH. For a direct communication among user devices, like a V2X communication, in LTE, the decoding and blind decoding may be straight forward because the PSCCH is transmitted on certain known resource blocks, which may be configured or preconfigured. The LTE SCI, in accordance with reference [1], may include, in addition to the above-mentioned time-frequency resources one or more of the following information:
- a time repetition pattern index, TRPI, that indicates a set of sub-frames used for the PSSCH transmission,
- a frequency hopping flag,
- a resource block and hopping resource allocation so as to indicate resource blocks within the sub-frames indicated by the TRPI to be used for the PSSCH transmission,
- a resource allocation field,
- an indication of the MCS for the PSSCH, for example 5 bits,
- a group destination ID, for example, 8 bits, indicating the group of UEs for which the SL communication is intended,
- a timing advance indicator, for example, an 11-bit indicator.

Thus, similar to the downlink control information, DCI, or the uplink control information, UCI, used for a communication from a mobile user to a base station using the Uu interface, the SCI provides the needed control information for the sidelink, SL, transmission. As mentioned above, the SCI is carried by the PSCCH and enables the receiving sidelink UE to properly detect and decode the data transmission on the PSSCH, and to extract the data from the SL-SCH, namely from the transport channel, also referred to as to the SL shared channel.

Like in LTE, also in NR, direct communications among user devices are enabled, for example, V2X communications, so that NR also provides for SCI on a physical layer, and, in addition, NR supports unicast and groupcast communications on the sidelink communication, in addition to a broadcast communication, which is the only SL communication allowed in LTE.

Conventionally, a single-stage SCI design is employed in LTE, however, the SCI may be split into several parts, for example, into a first part and into a second part, and such a split SCI is also referred to as a two-stage SCI. The first part of the first stage of the SCI may be decoded, for example, by all sidelink UEs, and the second part or the second stage may be decoded by the sidelink UEs for which the current communication or transmission is intended or which are addressed by the current SL communication. The two-stage SCI may have advantages over a single-stage SCI. For example, in case the same SCI size is shared between a broadcast, a unicast and a multicast or groupcast communication, even though this may reduce the complexity with regard to a decoding process, like blind decoding, the efficiency may decrease, especially for broadcast communications, as some padding information is to be added. The two-stage SCI may be advantageous because the first part or first stage may be used for providing some or more essential information for the sidelink communication, and the second stage or second part of the SCI includes detailed information for decoding the data channel, for example the PSSCH that is decoded in case the SCI is actually intended for a UE that identified the first part of the SCI. Thus, for different cast communications, the SCI sizes may differ which may lead to an increase in the decoding process time when decoding the first part or first stage of the SCI.

Figure 4:
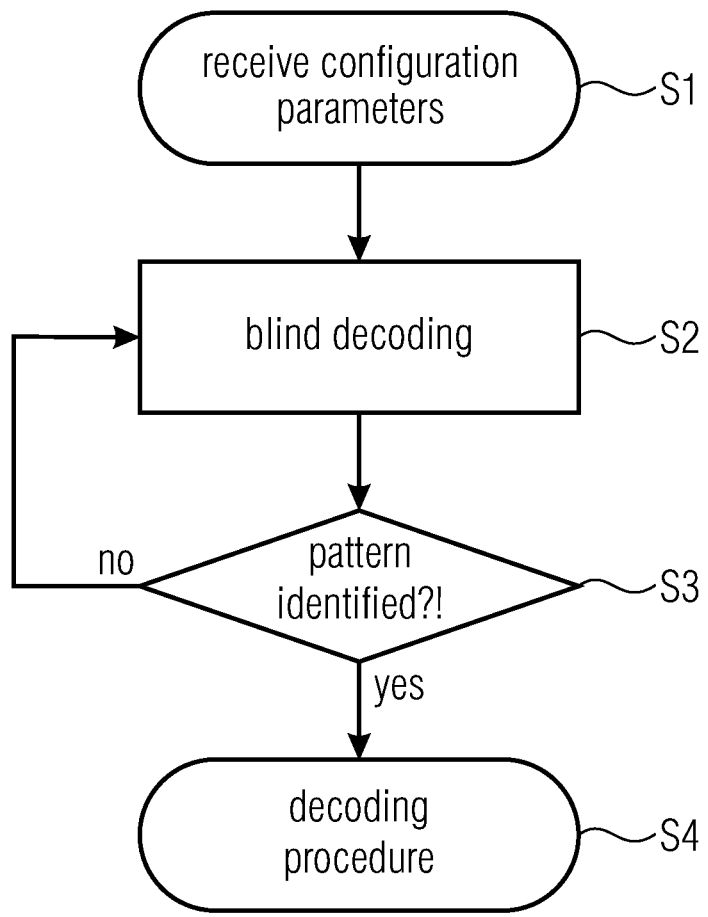
FIG. 4 illustrates a flow diagram of a first stage SCI blind decoding process.

To address this issue, a two-step decoding algorithm for the first part or first stage of the SCI is used. FIG. 4 illustrates a flow diagram of a first stage SCI blind decoding process. Initially, at S1, the UE that is to participate in a sidelink communication, may receive certain configuration parameters for the sidelink communication. The UE, which in the context of the SL communication may be referred to as to the receiving UE, starts blind decoding, as is indicated at S2 on the first part of the SCI. Once a pattern is identified, as is indicated at S3, i.e., once a first part of the SCI or the SCI has been identified to be intended for the receiving UE, the receiving UE, as indicated at S4, performs a decoding procedure for decoding information from the first stage or first part SCI. In other words, for addressing the time complexity associated with a blind decoding, the above-described two-step decoding algorithm may be employed where, initially, the first part of the SCI, for example, the format type, may be identified by means of blind decoding, for example based on different DMRS patterns (see S2, S3 in FIG. 4). Then, at a second stage (see S4 in FIG. 4 above) a normal decoding may be applied to derive the information embedded in the first part of the SCI that has been identified at the first step.

The SCI may be indicated to the receiving UE as being a two-stage SCI using a certain parameter, for example the parameter cdm-type which may be configured using an RRC configuration or reconfiguration message in case the receiving UE is in the connected mode, or by a system information block, SIB, for example in case the receiving UE is in the idle mode.

The present invention provides approaches for improving the SCI design, both the single stage SCI and the two-stage SCI design, so as to provide, for example, improvements, for example, in terms of flexibility, complexity, forward compatibility, overhead, latency, robustness, reliability.

Figure 1B:
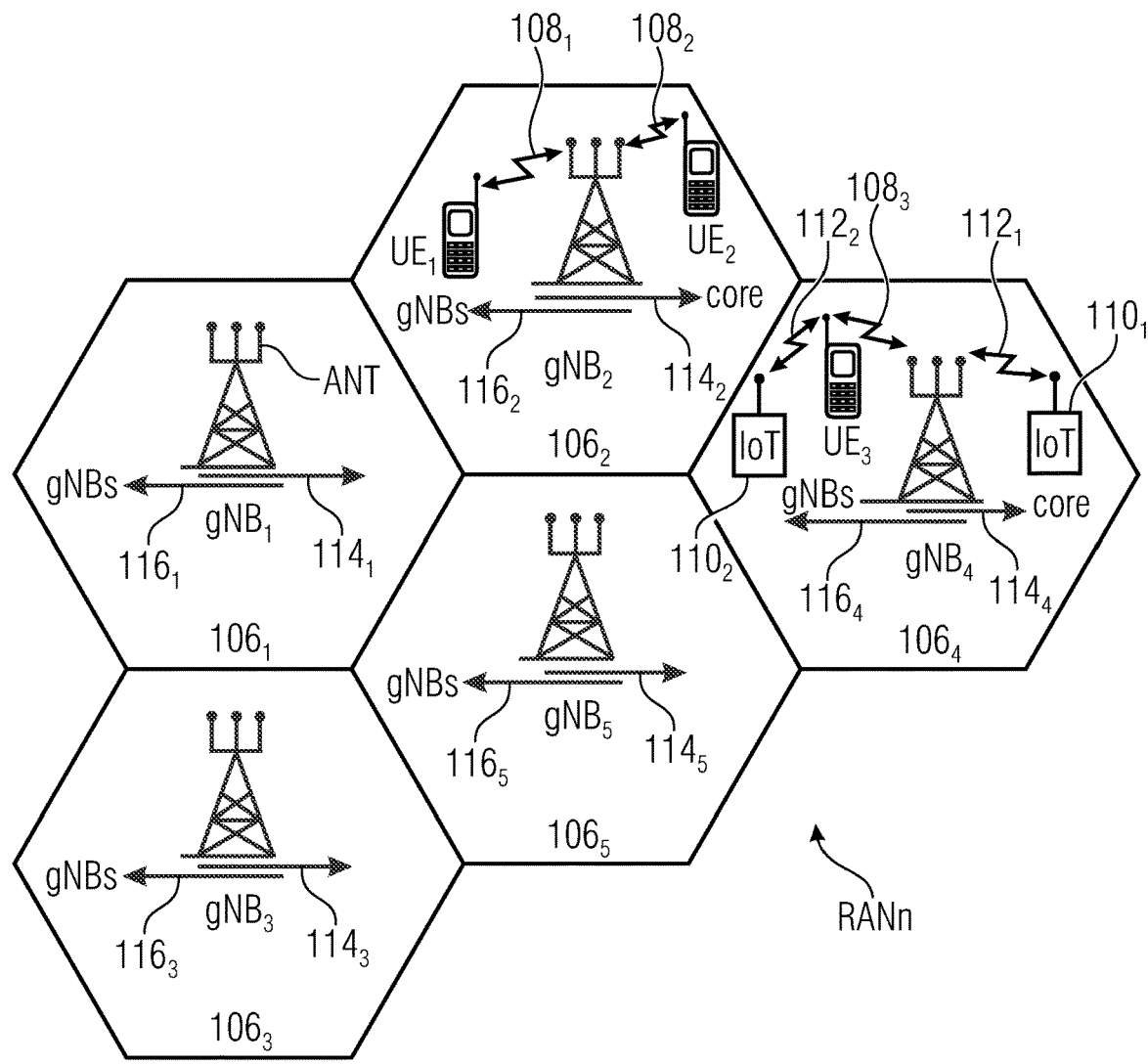
Figure 2:
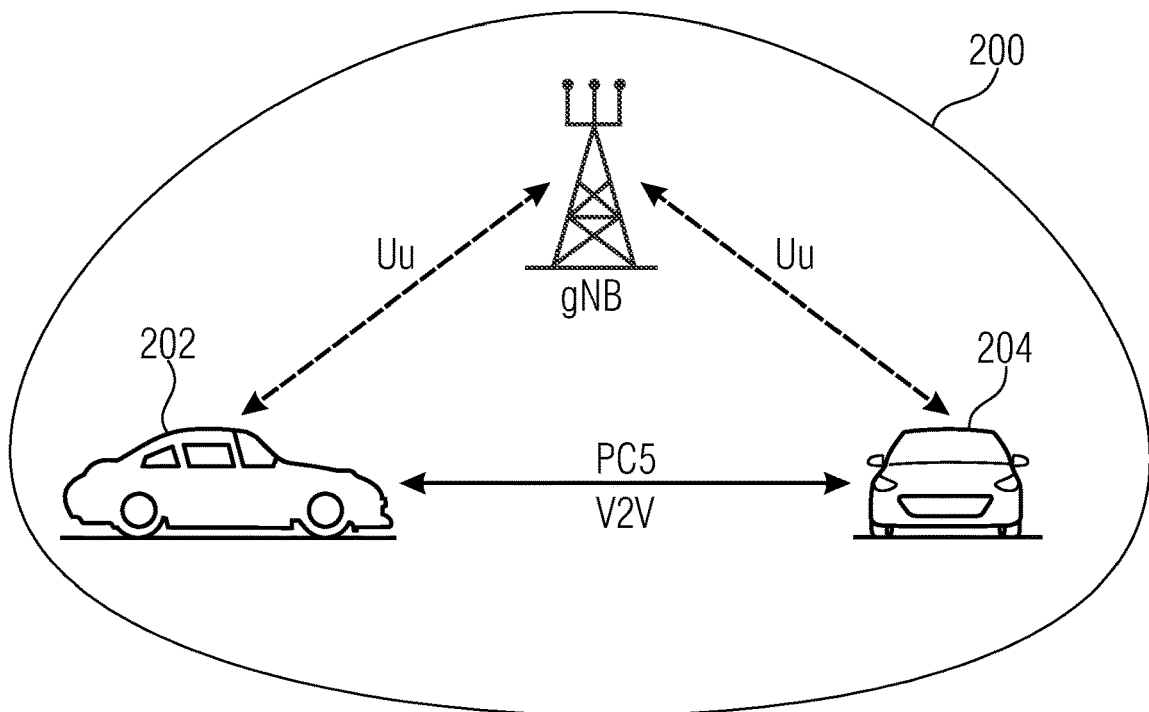
FIG. 2 is a schematic representation of an in-coverage scenario in which UEs directly communicating with each other are connected to a base station.
Figure 3:
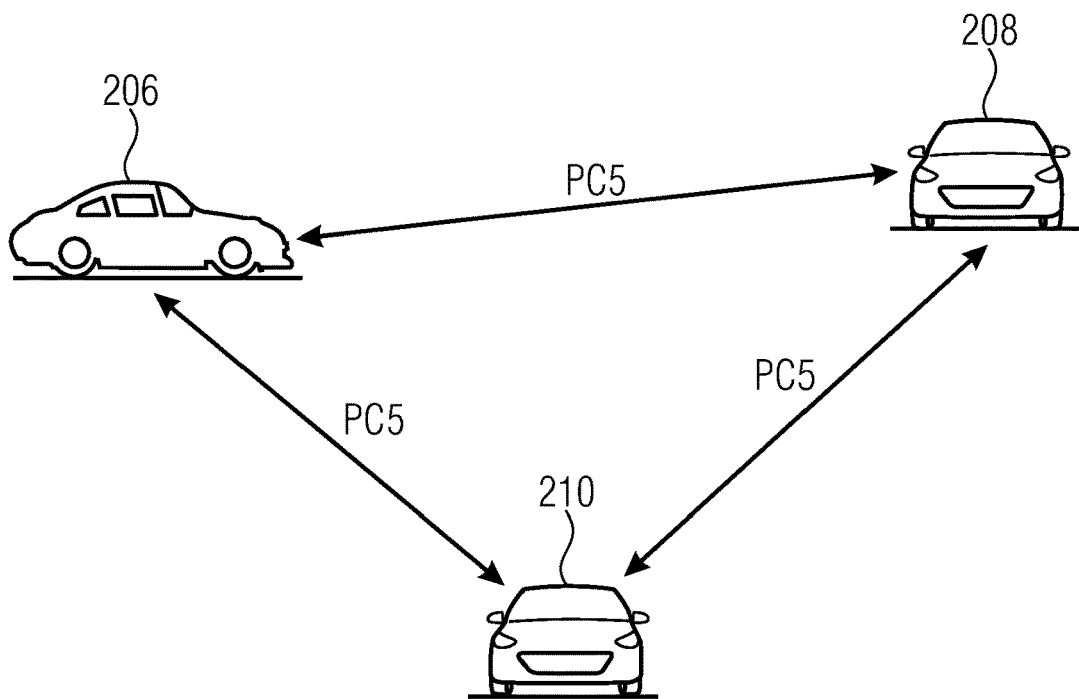
FIG. 3 is a schematic representation of an out-of-coverage scenario in which UEs directly communicating with each other receive no SL resource allocation configuration or assistance from a base station.
Figure 5:
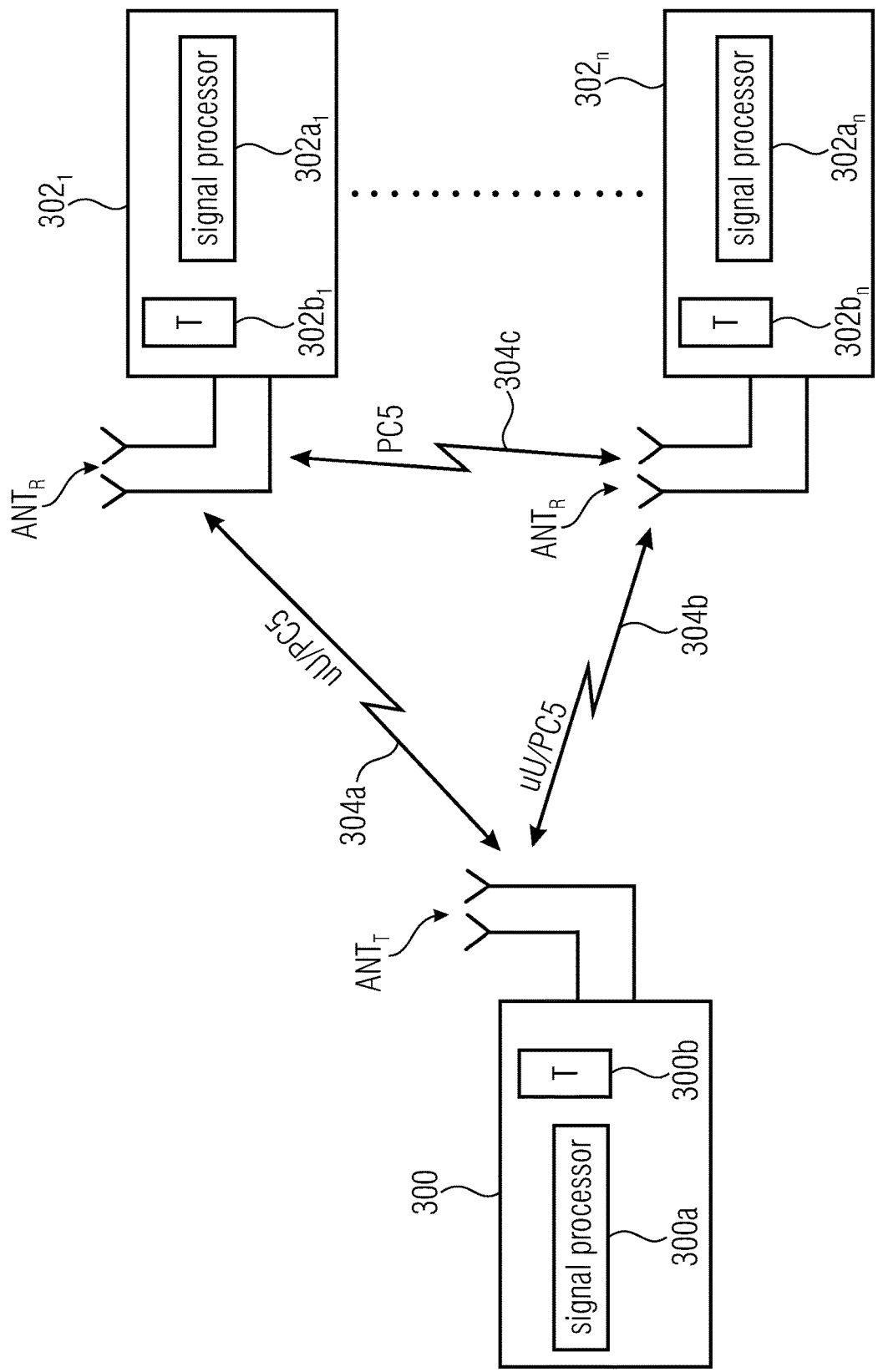
FIG. 5 is a schematic representation of a wireless communication system including a transmitter, like a base station, and one or more receivers, like user devices, UEs.

Embodiments of the present invention may be implemented in a wireless communication system as depicted in FIG. 1, FIG. 2, and FIG. 3 including base stations and users, like mobile terminals or IoT devices. FIG. 5 is a schematic representation of a wireless communication system including a transmitter 300, like a base station, and one or more receivers $302_1$ to $302_n$, like user devices, UEs. The transmitter 300 and the receivers 302 may communicate via one or more wireless communication links or channels 304a, 304b, 304c, like a radio link. The transmitter 300 may include one or more antennas $ANT_T$ or an antenna array having a plurality of antenna elements, a signal processor 300a and a transceiver 300b, coupled with each other. The receivers 302 include one or more antennas $ANT_R$ or an antenna array having a plurality of antennas, a signal processor $302a_1$, $302a_n$, and a transceiver $302b_1$, $302b_n$ coupled with each other. The base station 300 and the UEs 302 may communicate via respective first wireless communication links 304a and 304b, like a radio link using the Uu interface, while the UEs 302 may communicate with each other via a second wireless communication link 304c, like a radio link using the PC5 interface. When the UEs are not served by the base station, are not be connected to a base station, for example, they are not in an RRC connected state, or, more generally, when no SL resource allocation configuration or assistance is provided by a base station, the UEs may communicate with each other over the sidelink. The system, the one or more UEs and the base stations may operate in accordance with the inventive teachings described herein.

User Device/Network Entity

The present invention provides a user device, UE, for a wireless communication system, wherein
  the UE is to be connected to one or more further UEs in the wireless communication system for a sidelink communication with the one or more further UEs, the sidelink communication including one or more sidelink control messages, e.g., a Sidelink Control Information, SCI, to be transmitted on sidelink resources,
  the UE is to identify a sidelink control message for the UE by blind decoding,
  the UE is to decode the sidelink control message for the UE to derive control information embedded the sidelink control message, and
  the UE is pre-configured or configured by a network or a base-station with a sidelink, SL, search space, e.g., a SL-CORESET or SL control channel occasions, in the sidelink resources, the sidelink search space including one or more search occasions where the UE is to perform the blind decoding on the sidelink resources.

In accordance with embodiments, the SL search space includes one or more of a UE-common SL search space and a UE-specific SL search space.

In accordance with embodiments, the UE is to receive
  a broadcast message or a common search space message, like a system information block, SIB, or a group common control channel, configuring the UE-common SL search space for all UEs or a group of UEs, or
  a dedicated message, like a radio resource control, RRC, message, configuring the UE-specific SL search space for the UE, or
  a pre-configuration message configuring the UE-common SL search space.

In accordance with embodiments, the UE-common SL search space identifies one or more of:
  common SL frequency resources, e.g., selected subchannels or PRBs, selected resource pools, or a common BWP,
  a common band or common resources to be used for a broadcast, a unicast or a groupcast.

In accordance with embodiments, the UE-common SL search space identifies one or more of:
  common SL time resources occasions within the slot for a slot transmission, e.g., at the beginning of the slot,
  common SL time resources occasions within the slot for sub-slot transmission, e.g., at the beginning of each sub-slot,
  common SL time resources occasions periodicity and/or a bitmap slot position,
  common time-domain occasions to be used for a broadcast, a unicast or a groupcast.

In accordance with embodiments, the UE-specific SL search space identifies one or more of:
  specific SL frequency resources, e.g., selected subchannels or PRBs, selected resource pools, or a common BWP,
  a specific band or specific resources to be used for a broadcast, a unicast or a groupcast.

In accordance with embodiments, the UE-specific SL search space identifies one or more of:
  specific SL time resources occasions within the slot for a slot transmission, e.g., at the beginning of the slot,
  specific SL time resources occasions within the slot for sub-slot transmission, e.g., at the beginning of each sub-slot,
  specific SL time resources occasions periodicity and/or the bitmap slot position,
  specific time-domain occasions to be used for a broadcast, or a unicast or a groupcast.

In accordance with embodiments, the UE-specific SL search space identifies a search space signaled by a transmitting UE to be used by the receiving UE or a group of receiving UEs, e.g., using a physical, L1, SL control channel, or an in-data control channel, or an SL-RRC control message.

In accordance with embodiments, the SL search space defines a number of symbols in time, e.g., NsymbSL-CORSET, and a number of resource blocks, RBs, e.g., NRBSL-CORSET, and a location of the resources blocks within the sidelink resources, like a resource pool or a SL-bandwidth part, SL-BWP.

In accordance with embodiments, the sidelink control message includes at least a first part, e.g., a first stage, and a second part, e.g. a second stage, and wherein the sidelink search space includes one or more search occasions where the UE is to perform the blind decoding for identifying the first part of the sidelink control message.

The present invention provides a network entity for a wireless communication system, the wireless communication including one or more UEs to be connected to one or more:
  further UEs for a sidelink communication with the one or more further UEs, the sidelink communication including one or more sidelink control messages, e.g., Sidelink Control Information, SCI, to be transmitted on sidelink resources, wherein
  the network entity is to signal to a receiving UE or a group of receiving UEs a UE-specific SL search space, e.g., a SL-CORESET, in the sidelink resources, so as to indicate to the receiving UE one or more search occasions where the receiving UE is to perform blind decoding on the sidelink resources for identifying a sidelink control message for the receiving UE, e.g., a Sidelink Control Information, SCI.

In accordance with embodiments, the network entity is a transmitting user device, UE, and wherein, once a SL communication using the UE-specific SL search space with a receiving UE is completed or interrupted, the transmitting UE is to employ a UE-common SL-search space.

The present invention provides a user device, UE, for a wireless communication system, wherein
  the UE is to be connected to one or more further UEs in the wireless communication system for a sidelink communication with the one or more further UEs, the sidelink communication including one or more sidelink control messages, e.g., a Sidelink Control Information, SCI, to be transmitted on sidelink resources,
  the UE is to identify the sidelink control message for the UE,
  the UE is to decode the sidelink control message for the UE to derive control information embedded the sidelink control message, and
  the information embedded in the sidelink control message indicates a configuration of a further message, the further message including further control information and/or data.

In accordance with embodiments, the information embedded in the sidelink control message indicates time and frequency resources for the further message.

In accordance with embodiments, the time and frequency resources for the sidelink control message and the time and frequency resources for the further message are one or more of
  adjacent in time domain,
  non-adjacent in the time domain, with or without a time gap between the time and frequency resources for the sidelink control message and the time and frequency resources for the further message,
  adjacent in the frequency domain, e.g., equal frequency resources or equal subchannel lengths,
  non-adjacent in the frequency domain, e.g., different frequency resources or different subchannel lengths,
  in the same resource pool, or
  in different resource pools, In accordance with embodiments, the information embedded in the sidelink control message indicates one or more of
  a number of symbols in the time domain, e.g. 1, 2 or 3 symbols in the time domain, or more than 3 symbols in the time domain,
  whether a transmission is a unicast transmission, a groupcast transmission or a broadcast transmission,
  indicates a time offset of the further message from the sidelink control message, e.g., in case the sidelink control message spans all frequencies of the further message, wherein the time offset may be pre-coded in a look-up table, LUT,
  a pointer to a physical channel associated with the sidelink control message, e.g., a PSCCH of and/or a shared channel PSSCH channel of the further message, or a PSFCH channel of the further message.

In accordance with embodiments, the information embedded in the sidelink control message indicates a periodicity of transmissions of the of the sidelink message and/or the further message.

In accordance with embodiments, a predefined value for the periodicity may be provided to signal either a single shot transmission of the sidelink control message and/or the further message without any periodicity or a release of a previous periodicity.

In accordance with embodiments, the information embedded in the first part of the sidelink control message indicates one or more of:
  a priority of a transmission associated with the sidelink control message,
  a new data indicator, NDI, or a retransmission indicator indicating whether a transmission associated with the sidelink control message includes new data and is a retransmission,
  a retransmission gap indicating whether a retransmission is a non-autonomous retransmission or that an autonomous retransmission is active with a configured retransmission gap,
  a DMRS pattern for the second part of the sidelink control message,
  a CDM group and/or ports for the second part of the sidelink control message and the sidelink data channel, like the PSSCH,
  a timing advance indicator.

In accordance with embodiments, the sidelink control message includes a first part of the control information, e.g., a first stage SCI, and the further message includes at least a second part of the control information, e.g. a second stage SCI, and/or one or more transmission reservations for the data.

The present invention provides a network entity for a wireless communication system, the wireless communication including one or more UEs to be connected to one or more further UEs for a sidelink communication with the one or more further UEs, the sidelink communication including one or more sidelink control messages, e.g., Sidelink Control Information, SCI, to be transmitted on sidelink resources, wherein:
  the network entity is to signal to a receiving UE or a group of receiving UEs a sidelink control message, wherein information embedded in the sidelink control message indicates a configuration of a further message, the further message including further control information and/or data.

The present invention provides a user device, UE, for a wireless communication system, wherein
  the UE is to be connected to one or more further UEs in the wireless communication system for a sidelink communication with the one or more further UEs, the sidelink communication including one or more sidelink control messages, e.g., a Sidelink Control Information, SCI, to be transmitted on sidelink resources, a sidelink control message including at least a first part, e.g., a first stage, and a second part, e.g. a second stage,
  the UE is to identify a first part of a sidelink control message for the UE by blind decoding,
  the UE is to decode the first part of the sidelink control message for the UE to derive control information embedded the sidelink control message, and
  the UE is to identify from the first part of the sidelink control message a reference signal, e.g., a certain demodulation reference signal, DMRS, pattern, accompanying the first part of a sidelink control message.

The present invention provides a network entity for a wireless communication system, the wireless communication including one or more UEs to be connected to one or more further UEs for a sidelink communication with the one or more further UEs, the sidelink communication including one or more sidelink control messages, e.g., Sidelink Control Information, SCI, to be transmitted on sidelink resources, a sidelink control message including at least a first part, e.g., a first stage, and a second part, e.g. a second stage, wherein the network entity is to signal to a receiving UE or a group of receiving UEs in or together with the first part of the sidelink control message a reference signal, e.g., a certain demodulation reference signal, DMRS.

In accordance with embodiments, the reference signal has a pattern associated with a certain cast type of the second part of the sidelink control message.

In accordance with embodiments, the reference signal has a pattern associated with certain use-cases with certain QoS of the second part of the sidelink control message.

In accordance with embodiments, the reference signal is selected from a plurality of reference signals having pattern being different from each other in one or more of the frequency domain,
the time domain,
the code domain, like different orthogonal or quasi-orthogonal coding schemes or code division multiplexing, CDM,
the space domain, like different port IDs.

so that each of the plurality of reference signals is associated with a certain cast type.

In accordance with embodiments, some or all of the plurality of reference signals have a unique design, e.g., orthogonal or quasi-orthogonal DMRS patterns, to protect the UE from collisions.

In accordance with embodiments, the reference signal is a DMRS having a DMRS type 1 configuration.

In accordance with embodiments, the first part of the sidelink control message is accompanied by a plurality of reference signals, e.g., certain DMRS patterns.

In accordance with embodiments, the same or different reference signals are repeated over the time domain, so as to be repeated in every symbol of the first part of the sidelink control message, or
repeated in some of the symbols of the first part of the sidelink control message according to a certain pattern.

In accordance with embodiments, a repetition rate of reference signals depends on a velocity with which the UE moves, e.g., the repetition rate may be higher when the UE moves with a first speed, and the repetition rate may be lower when the UE moves with a second speed, the first speed being higher than the second speed.

The present invention provides a user device, UE, for a wireless communication system, wherein the UE is to be connected to one or more further UEs in the wireless communication system for a sidelink communication with the one or more further UEs, the sidelink communication including one or more sidelink control messages, e.g., a Sidelink Control Information, SCI, to be transmitted on sidelink resources, a sidelink control message including at least a first part, e.g., a first stage, and a second part, e.g. a second stage,
the UE is to identify a first part of a sidelink control message for the UE,
the UE is to determine from the first part of the sidelink control message whether the sidelink control message is intended for the UE.

In accordance with embodiments, the UE is not to expect, e.g., is not to read or is not to decode, the second part of the sidelink control message in case the first part of the sidelink control message includes a UE ID, e.g., which can be one of a UE destination ID, indicating, e.g., a unicast communication, or a group ID, e.g., a group destination ID, indicating, e.g., a groupcast communication, where the UE ID or group ID does not match an ID of the UE,
a broadcast ID, like a broadcast flag or a broadcast bit, indicating a non-broadcast type of communication, and includes a UE ID or group ID, which does not match an ID of the UE.

In accordance with embodiments, the first part of the sidelink control message includes a broadcast ID and a UE or group ID, in case the broadcast ID indicates a broadcast type of communication, e.g., a broadcast flag is set to a first value, the UE determines the second part of the sidelink control message to be relevant for the UE, and is to expect, e.g., is to read or is to decode, the second part of the sidelink control message,
in case the broadcast ID indicates a non-broadcast type of communication, e.g., a broadcast flag is set to a second value, the UE is to determine from the UE or group ID whether the second part is relevant for the UE, e.g., when the UE or group ID match an ID of the UE, and is to expect, e.g., is to read or is to decode, a relevant second part of the sidelink control message.

In accordance with embodiments, the UE is to expect, e.g., is to read or is to decode, the second part of the sidelink control message in case the first part of the sidelink control message includes a UE ID or a group ID that matches an ID of the UE, or
a broadcast ID indicating a broadcast type of communication, or does not include any type of ID.

In accordance with embodiments, in case the sidelink control message may be scrambled, e.g., using CRC scrambling, with a UE ID or a group ID or a broadcast ID, the UE is not to expect, e.g., is not to read or is not to decode, the second part of the sidelink control message in case a descrambling yields one or more of:
a broadcast ID indicating a non-broadcast type of communication, and the UE ID or a group ID does not match an ID of the UE, or
a UE ID or a group ID does not match an ID of the UE, and
the UE is to expect, e.g., is to read or is to decode, the second part of the sidelink control message in case the descrambling yields
a UE ID or a group ID that matches an ID of the UE or
a broadcast ID indicating a broadcast type of communication, or
no ID.

In accordance with embodiments, the UE is to implicitly derive a cast type from a UE ID or a group ID or a broadcast ID or an absence of any ID in the first part of the sidelink control message as follows:

a broadcast in case of the absence of any ID or a broadcast ID set to broadcast in the first part of the sidelink control message,
a groupcast in case of a groupcast ID or multiple UE IDs in the first part of the sidelink control message,
a unicast in case of a unicast ID in the first part of the sidelink control message.

In accordance with embodiments, the UE is not to expect, e.g., is not to read or is not to decode, a second part of the sidelink control message in case the first part of the sidelink control message includes a broadcast ID indicating a broadcast type of communication, e.g., in case of a single-stage broadcast.

In accordance with embodiments, the UE is to determine whether the sidelink control message is intended for the UE from a source ID in the first part of the sidelink control message, the source ID being a source ID of an originator of a unicast communication or of an originator of the groupcast communication.

The present invention provides a network entity for a wireless communication system, the wireless communication including one or more UEs to be connected to one or more further UEs for a sidelink communication with the one or more further UEs, the sidelink communication including one or more sidelink control messages, e.g., Sidelink Control Information, SCI, to be transmitted on sidelink resources, a sidelink control message including at least a first part, e.g., a first stage, and a second part, e.g. a second stage, wherein
the network entity is to indicate in the first part of the sidelink control message whether the sidelink control message is intended for a receiving UE.

In accordance with embodiments, the UE is to derive from the information in the first part of the sidelink control message whether the sidelink control message is intended for the UE.

In accordance with embodiments the user device or the network comprise
one or more of a mobile terminal, or stationary terminal, or cellular IoT-UE, or a vehicular UE, or an IoT or narrowband IoT, NB-IoT, device, or a ground based vehicle, or an aerial vehicle, or a drone, or a moving base station, or a road side unit, or a building, or any other item or device provided with network connectivity enabling the item/device to communicate using the wireless communication network, e.g., a sensor or actuator, or
a base station including one or more of a macro cell base station, or a small cell base station, or a central unit of a base station, or a distributed unit of a base station, or a road side unit, or a UE, or a remote radio head, or an AMF, or an SMF, or a core network entity, or a network slice as in the NR or 5G core context, or any transmission/reception point, TRP, enabling an item or a device to communicate using the wireless communication network, the item or device being provided with network connectivity to communicate using the wireless communication network.

System

The present invention provides a wireless communication system comprising an inventive user device or an inventive network entity.

In accordance with embodiments, the wireless communication system comprises one or more base stations, wherein the base station comprises one or more of a macro cell base station, or a small cell base station, or a central unit of a base station, or a distributed unit of a base station, or a road side unit, or a UE, or a remote radio head, or an AMF, or an SMF, or a core network entity, or a network slice as in the NR or 5G core context, or any transmission/reception point, TRP, enabling an item or a device to communicate using the wireless communication network, the item or device being provided with network connectivity to communicate using the wireless communication network.

Methods

The present invention provides a method for a wireless communication system, the method comprising:
connecting a UE to one or more further UEs in the wireless communication system for a sidelink communication with the one or more further UEs, the sidelink communication including one or more sidelink control messages, e.g., a Sidelink Control Information, SCI, to be transmitted on sidelink resources,
identifying, by the UE, a sidelink control message for the UE by blind decoding, and
decoding, by the UE, the sidelink control message for the UE to derive control information embedded the sidelink control message, and
wherein the UE is pre-configured or configured by a network or a base-station with a sidelink, SL, search space, e.g., a SL-CORESET or SL control channel occasions, in the sidelink resources, the sidelink search space including one or more search occasions where the UE is to perform the blind decoding on the sidelink resources.

The present invention provides a method for a wireless communication system, the wireless communication including one or more UEs to be connected to one or more further UEs for a sidelink communication with the one or more further UEs, the sidelink communication including one or more sidelink control messages, e.g., Sidelink Control Information, SCI, to be transmitted on sidelink resources, the method comprising:
signaling, by a network entity, to a receiving UE or a group of receiving UEs a UE-specific SL search space, e.g., a SL-CORESET, in the sidelink resources, so as to indicate to the receiving UE one or more search occasions where the receiving UE is to perform blind decoding on the sidelink resources for identifying a sidelink control message for the receiving UE, e.g., a Sidelink Control Information, SCI.

The present invention provides a method for a wireless communication system, the method comprising
connecting a UE to one or more further UEs in the wireless communication system for a sidelink communication with the one or more further UEs, the sidelink communication including one or more sidelink control messages, e.g., a Sidelink Control Information, SCI, to be transmitted on sidelink resources,
identifying, by the UE, a sidelink control message for the UE by blind decoding, and
decoding, by the UE, the sidelink control message for the UE to derive control information embedded the sidelink control message,
wherein the information embedded in the sidelink control message indicates a configuration of a further message, the further message including further control information and/or data.

The present invention provides a method for a wireless communication system, the wireless communication including one or more UEs to be connected to one or more further UEs for a sidelink communication with the one or more further UEs, the sidelink communication including one or more sidelink control messages, e.g., Sidelink Control Information, SCI, to be transmitted on sidelink resources, the method comprising:
signaling, by a network entity, to a receiving UE or a group of receiving UEs a sidelink control message, wherein information embedded in the sidelink control message indicates a configuration of a further message, the further message including further control information and/or data.

The present invention provides a method for a wireless communication system, the method comprising
connecting a UE to one or more further UEs in the wireless communication system for a sidelink communication with the one or more further UEs, the sidelink communication including one or more sidelink control messages, e.g., a Sidelink Control Information, SCI, to be transmitted on sidelink resources, identifying, by the UE, a sidelink control message for the UE by blind decoding, and decoding, by the UE, the sidelink control message for the UE to derive control information embedded the sidelink control message, wherein the UE identifies from the first part of the sidelink control message a reference signal, e.g., a certain demodulation reference signal, DMRS, pattern, accompanying the first part of a sidelink control message.

The present invention provides a method for a wireless communication system, the wireless communication including one or more UEs to be connected to one or more further UEs for a sidelink communication with the one or more further UEs, the sidelink communication including one or more sidelink control messages, e.g., Sidelink Control Information, SCI, to be transmitted on sidelink resources, a sidelink control message including at least a first part, e.g., a first stage, and a second part, e.g. a second stage, the method comprising:

signaling, by a network entity, to a receiving UE or a group of receiving UEs in or together with the first part of the sidelink control message a reference signal, e.g., a certain demodulation reference signal, DMRS.

The present invention provides a method for a wireless communication system, the method comprising connecting a UE to one or more further UEs in the wireless communication system for a sidelink communication with the one or more further UEs, the sidelink communication including one or more sidelink control messages, e.g., a Sidelink Control Information, SCI, to be transmitted on sidelink resources, identifying, by the UE, a sidelink control message for the UE, and determining, by the UE, from the first part of the sidelink control message whether the sidelink control message is intended for the UE.

The present invention provides a method for a wireless communication system, the wireless communication including one or more UEs to be connected to one or more further UEs for a sidelink communication with the one or more further UEs, the sidelink communication including one or more sidelink control messages, e.g., Sidelink Control Information, SCI, to be transmitted on sidelink resources, a sidelink control message including at least a first part, e.g., a first stage, and a second part, e.g. a second stage, the method comprising:

indicating, by the network entity, in the first part of the sidelink control message whether the sidelink control message is intended for a receiving UE.

Computer Program Product

The present invention provides a computer program product comprising instructions which, when the program is executed by a computer, causes the computer to carry out one or more methods in accordance with the present invention.

Embodiments of the present invention, as mentioned above, provide for improvements and enhancements of a single-stage or a two-stage sidelink control message, like a two-stage SCI, as it may be employed in NR sidelink communications, like V2X communications or the like. In the following, several aspects of the present invention are described which provide for enhancements with regard to the flexibility, complexity, forward compatibility, overhead, specification impact, latency, robustness and. The subsequently described aspects may be used independently from each other or some or all of the aspects may be combined. Further, when referring in the following description to a first part of the sidelink control information or to a first stage SCI, this may simply refer to a sidelink control message or SCI, like a single-stage SCI, or a sidelink control message or SCI including at least a first part, e.g., a first stage, and a second part, e.g. a second stage, or a sidelink control message or SCI including a first part of the control information and being associated with of followed by a further message that includes at least a second part of the control information, e.g. a second stage SCI, and/or data to be transmitted.

First Aspect

In accordance with embodiments of a first aspect of the present invention, a search space may be configured so as to indicate to a UE participating in a sidelink communication the search occasions to perform blind decoding so as to identify a first part of a two-stage SCI as indicated at S2 in FIG. 4 above. In wireless communication systems and networks certain resources may be allocated to a sidelink communication, which are also referred as resource sets or resource pools. Some of the sidelink resources may be used for control purposes, and respective sidelink control resource sets, SL-CORESETs, may be identified, and within such a SL-CORESET one or more search spaces for a receiving UE may be identified.

In accordance with embodiments, the search space may be configured for all UEs or for a group of UEs using a broadcast message, for example the system information block, SIB, or a group common control channel. In accordance with other embodiments, a receiving UE may receive the signaling indicating a specific search space that is to be used by the receiving UE for the blind decoding from a transmitting UE, using, for example, a dedicated radio resource control, RRC, message. In accordance with yet other embodiments, a UE participating in a sidelink communication may be pre-configured with the search space using a pre-configuration message.

In accordance with embodiments, the search space may be used for one, some or all UEs on common SL frequency resources, for example in selected sub-channels or PRBs, in selected resource pools, or a common bandwidth part, BWP. In accordance with other embodiments, a search space, also referred to as a modified search space, may be signaled by one UE, for example a transmitting UE in the sidelink communication pair, to be used by one or more other UEs or by a group of UEs. For example, a transmitting UE, performing a unicast or groupcast communication, may signal its specific search space in a physical, L1, SL control channel, or in an in-data control channel, or in a SL-RRC control message.

In accordance with embodiments of the first aspect of the present invention, as described above, the search space, also referred to as to the first stage search space, the sidelink search space, or the SL space, contains the search occasions where a sidelink receiver UE performs decoding, like blind decoding, on the configured sidelink control resources or the sidelink control resource set, SL-CORESET. The SL-CORESET may define a number of symbols in time, e.g., $N_{symb}^{SL-CORESET}$, and a number of resource blocks, RBs, for example $N_{RB}^{SL-CORESET}$, as well as a location of the resource blocks within the resource pool or within a SL-bandwidth part, SL-BWP, for example, by defining the N_sub-channels-index. The SL-CORESET may be configured for all UEs in a common search space message which may be conveyed in an RRC broadcast message, for example in a system information block, SIB, message, like SIB18, SIB19, SIB20 and SIB26.

FIG. 6 illustrates an embodiment of a SL-search space information element that may be used for configuring sidelink UEs with the common search space and that may be signaled in a SIB. FIG. 6 illustrates, as an embodiment, that within the common search space in which the receiving UE is to perform decoding four different SCI formats may be employed. A second type of the SL-search space, besides the common search space, is the UE specific search space for which several SCI formats may be provided. The SL search spaces may be provided both for single-stage SCIs and two-stage SCIs.

In accordance with embodiments, a transmitting UE may receive a UE-specific RRC message for configuring the sidelink indicating, for example, that the transmitting UE is to use a UE-specific search space as indicated in the information element of FIG. 6 when transmitting to a receiving UE a SCI or a first stage SCI. The transmitting UE, in accordance with further embodiments, may switch from the UE-common search space to the UE-specific search space as follows:

1—A UE configured for sidelink, if operating in a cell configuring SL with SIB 18/19/21/26, shall be configured with a common search space.
2—If in the previously mentioned SIB messages, a search space is found (i.e., SL-SearchSpace)
   a. If in SL-SearchSpace a UE search space of type UE-common is configured
      i. Use the configured SL-search space for Broadcast, unicast, and multicast
3—If a UE specific SL-search space is configured via RRC
   a. If the RRC messages contains the SL-CORESET for dedicating a $1^{st}$-stage SCI
      i. If the UE has a successful SL-unicast or a successful SL-groupcast communication,
         1. The UE shall send in a SL control channel (L1 or SL-RRC) its configured UE specific SL-CORESET/SL-search space.

In accordance with embodiments, a UE-specific search space may have in the search space message or information element a search space type ue-specific, as is illustrated in FIG. 7.

In the following, further embodiments of the first aspect concerning the sidelink search space allocation are described. The UE common SL search space, when configured or preconfigured, may be a search space to be used for a UE, some UEs or all UEs in common SL frequencies, for example in selected sub-channels or PRBs, in selected resource pools or in a common BWP. The common band or the common resources may be used for a broadcast communication, or for a unicast/groupcast communication.

Figure 8:
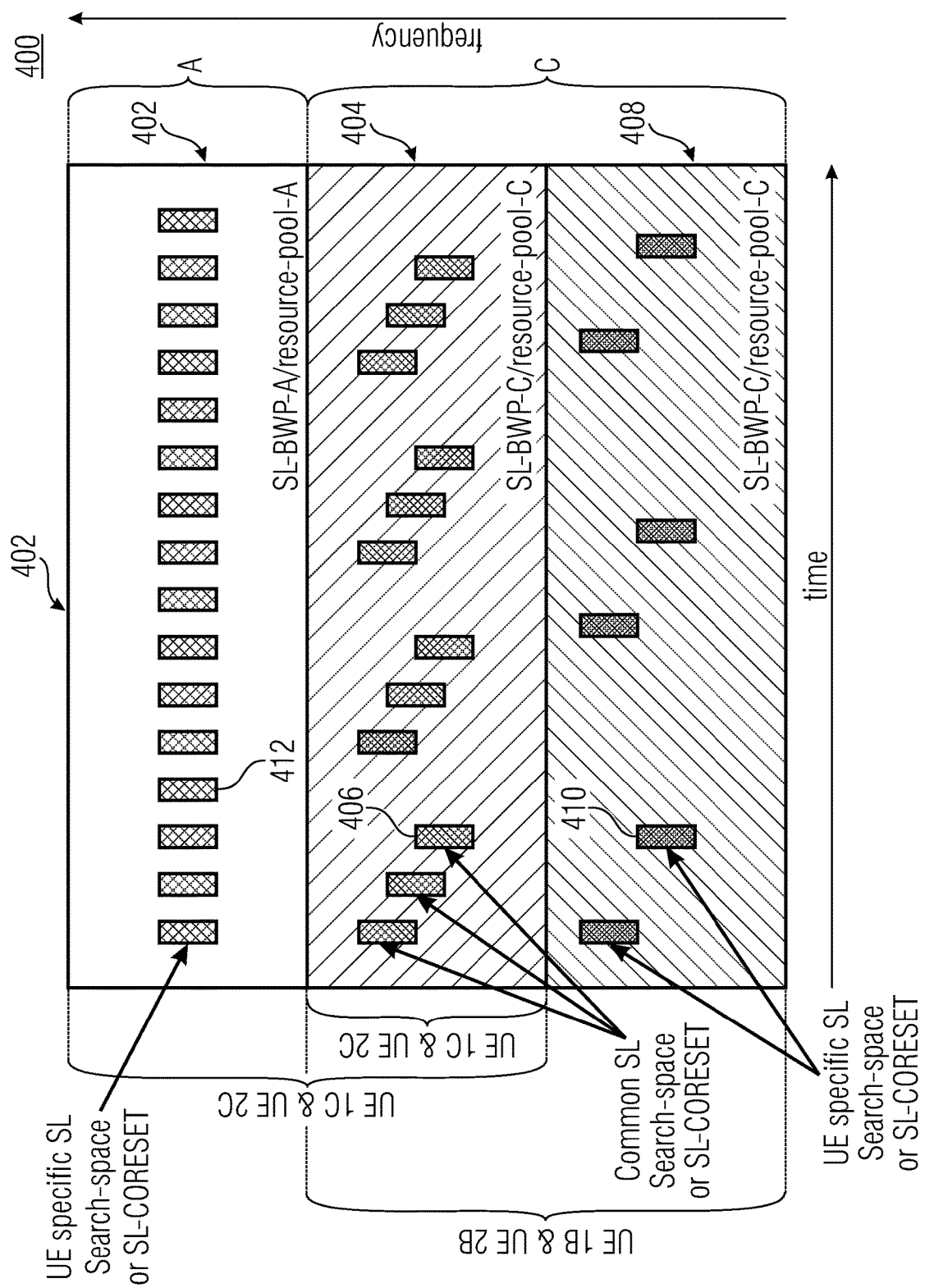
FIG. 8 illustrates an embodiment of the first aspect of the present invention using a common SL search space or common SL-CORESET in a common bandwidth part or resource pool that is accessible by some or all of the sidelink UEs.

On the other hand, in case the UE is configured with a SL-search space type UE-specific, i.e., employs a UE-specific search space, the UE may send a modified SL-search space to be used by a other UE or a group of UEs being partners in the sidelink communication, for example upon a successful unicast or groupcast transmission. A transmitting UE may signal its UE specific SL search space in a physical, L1, SL control channel, or in a data control channel or by using SL-RRC control messages. In accordance with embodiments, once a communication between the communication partners of the sidelink communication is terminated or interrupted, the transmitting UE may be requested to return to the use of the common SL search space. The UE specific SL search space may also be a search space to be used for a UE, some UEs or all UEs in specific SL frequencies, for example in selected sub-channels or PRBs, in selected resource pools or in a specific BWP. The specific band or the specific resources may be used for a broadcast communication, or for a unicast/groupcast communication FIG. 8 illustrates an embodiment of the first aspect of the present invention using a common SL search space or common SL-CORESET in a common bandwidth part or resource pool that is accessible by some or all of the UEs and in case a UE is involved in a sidelink communication with a receiving UE, for example for a unicast transmission or a groupcast transmission, the transmitting UE may signal to the receiving UE a UE-specific search space for the next one or more transmission periods. FIG. 8 illustrates schematically a part of the resources 400 in the time domain and in the frequency domain provided by a wireless communication system or network for a sidelink communication among a plurality of user devices, and within the sidelink resources 400 respective resources are used for transmitting control information which are also referred to as control resources 402. The control resources 402, in the embodiment of FIG. 8, comprise a first bandwidth part or a first resource pool A and a second bandwidth part or resource pool C. Within a first section 404 of the resource pool C a plurality of common SL-search spaces or SL-CORESETs 406 are defined. For example, when considering four UEs to perform a sidelink communication, namely UEs 1B, 2B, 1C and 2C. These UEs may be configured, for example by the above-described message or information element (see FIG. 6) with one or more of the SL-search spaces 406 in the first portion 404 of the resource pool C. As mentioned above, the common SL search spaces may be used by a transmitting UE and a receiving UE of the SL communication pair to establish initially a SL communication, like a unicast communication or groupcast communication, and once established, the transmitting UE may signal to one or more of the receiving UEs that for one or more of the following transmissions periods a UE specific search space is to be used. In the embodiment of FIG. 8, the UE specific SL-search space for UEs 1B and 2B are within a second portion 408 of the resource pool C, and FIG. 8 illustrates respective UE specific SL-search spaces 410 indicating search occasions for a receiving UE, i.e., occasions where to perform blind decoding to see as to whether sidelink control messages for the UE are transmitted. Thus, for UEs 1B and 2B, the common and UE specific SL-search spaces are within the same resource pool or bandwidth part, namely within bandwidth part C, however, the common SL search space and the UE specific SL-search space may also be in different bandwidth parts, as is illustrated with reference to FIG. 8 for UEs 1C and 2C. The UE specific SL-search spaces 412 for the UEs 1C and 2C are in resource pool C, and the common SL-search spaces are in resource pool A.

Figure 9:
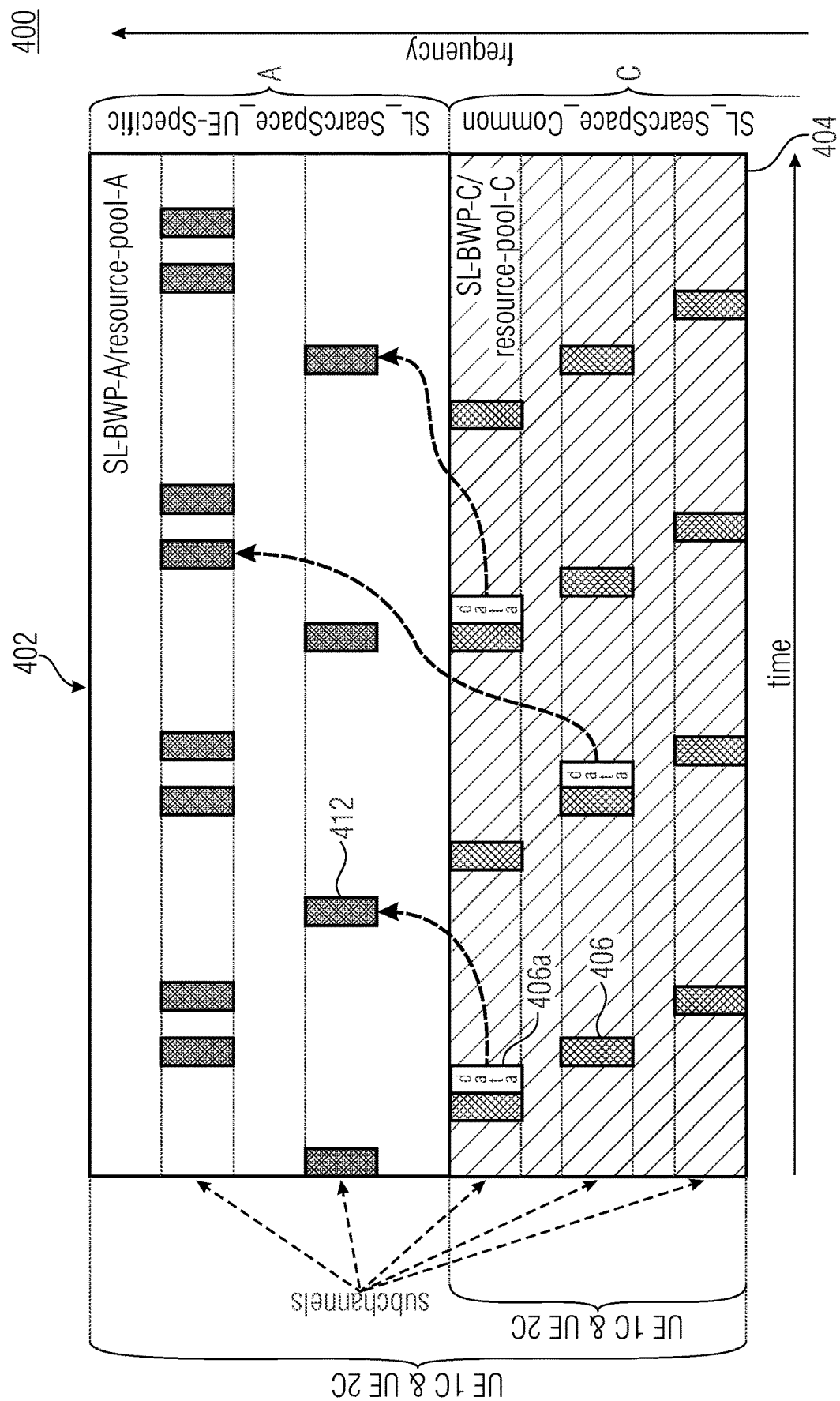
FIG. 9 illustrates an embodiment for the above-described switching from a common search pool to a UE specific search pool.

FIG. 9 illustrates an embodiment for the above-described switching from a common search pool to a UE specific search pool. FIG. 9 illustrates the upper part from FIG. 8, namely the first portion 404 or resource pool C as well as the resource pool A. Again, the portion 404 of resource pool C holds the common SL search spaces for UEs 1C and 2C. As is illustrated, the respective search spaces 406 are within respective subbands of the resource pool C. Within some of the common SL search spaces, labeled in FIG. 9 by 406*a*, a signaling may be included pointing to a UE specific SL search space in the resource pool A to be used by a receiving UE for one or more following transmission periods.

In accordance with embodiments, a sub-channel size in the frequency domain may not be included in the SIB message or in the RRC message, but only a number of symbols may be identified by these messages, and in such embodiments, the format is such that a fixed number of sub-channels is used for providing the common SL search space and/or the UE specific SL search space.

In an embodiment, the SL search space may be signaled (via RRC or SIB) indicating the offset from which the SL-1st stage SCI starts, e.g., via the SL-monitoringfrequency subchannel_offset. In another embodiment, the SL search space may signaled (via RRC or SIB) indicating the length of the search space in frequency, e.g., SL-monitoringfrequency subchannel_length, like the number of subchannels/RBs, etc. In yet another embodiment, if the field SL-monitoringfrequency subchannel_length is not identified, the UE may detect a 1st stage subchannel length from, e.g., a decoded/detected DMRS.

Second Aspect

Embodiments of the second aspect provide a SCI or sidelink control message has information embedded therein that indicates a configuration of a further message. The further message may include further control information and/or data. In accordance with embodiments, the sidelink control message may include a first part of the control information, e.g., a first stage SCI, and the further message may include at least a second part of the control information, e.g. a second stage SCI, and/or data to be transmitted or transmission reservation(s) for the data to be transmitted.

Thus, in accordance with embodiments, the first stage or first part of a SCI may configure time and frequency resources for the second part or second stage of the SCI and/or for the data transmitting part. For example, the first and second parts, i.e., the sidelink control message and the further message, may be adjacent or non-adjacent in the time domain, with or without a time gap between the first and second parts. The first and second parts may employ adjacent or non-adjacent frequency resources or sub-channels. The first and second parts may be in the same resource pool (see FIG. 8 above, lower part) or may be in different resource pools, i.e., be distributed across two or more resource pools, as illustrated above in the upper part of FIG. 8.

In accordance with yet further embodiments, a time offset between the first and second parts of the SCI/data may be configured, and the time offset may be pre-coded in a lookup table, LUT, for example in case the first stage spans all the frequencies of the second stage, i.e., the first stage or first part of the SCI occupies the same frequencies as the second part of the SCI/data. Moreover, in accordance with further embodiments, a pointer to a physical channel associated with the first stage may be identified so as to identify in the further message, for example, a control channel, like the PSCCH, and/or a data channel, like the PSSCH, or to identify in the further message only a control channel, like the PSCCH, or only a data channel, like a Physical Sidelink Feedback channel, PSFCH.

In the following several embodiments of the second aspect, more specifically several embodiments for a first stage or first part SCI design are described in more detail. In order to reduce blind decoding effort for SL UEs, the above-described two-stage SCI decoding may be employed, and a first stage of the SCI, in accordance with the second aspect of the present invention is designed to configure the further message, like second stage or second part and/or a PSSCH containing the data associated with the SL transmission. In accordance with embodiments, the time and frequency resources for the second stage are configured, and this information may be encoded implicitly or explicitly. The format or configuration to be used for the second part may be conveyed for the receiving UE in a UE-common SL space or a UE-specific SL search space as described above with reference to the first aspect.

In accordance with embodiments of the second aspect, the following different formats may be used:
Format_i_i
  Equal frequency resources/subchannel length and/or adjacent time-domain resources of the $1^{st}$ and $2^{nd}$ stage SCI and PSSCH (without a gap in time)
Format_i_j
  Equal frequency resources/subchannel length and/or non-adjacent time-domain resources of the $1^{st}$ and $2^{nd}$ stage SCI and PSSCH (without a gap in time)
Format_j_i
  Different frequency resources/subchannel length with adjacent time-domain resources (of the $1^{st}$ and $2^{nd}$ stage SCI and PSSCH (without a gap in time))
Format_j_j
  Different frequency resources/subchannel length with:
    Non-adjacent time-domain resources (of the $1^{st}$ and $2^{nd}$ stage SCI and PSSCH (without a gap in time))
    Cross pool/cross carrier/cross BWP
  Same resource pool or cross resource pool schedule In accordance with embodiments, one or more of the above-described formats may provide for a multi UE multiplexing approach, for example using CDM or the like, so as to reduce interference in the control channel. The above formats may have one symbol, two symbols or three symbols in the time domain, however, in accordance with further embodiments, there may also be provided more than three symbols.

The above-described formats may be used for a unicast communication, a groupcast communication and/or a broadcast communication, and in any of the formats, a field may be provided to introduce time and frequency locations as well as a field to introduce a periodicity of the transmission. However, the invention is not limited to formats including this information, rather, more simple formats may be provided which do not include the time/frequency location and/or the periodicity.

In the following, embodiments for implementing the above-described formats are described in more detail.
Short Format 1 of the Sidelink 1st-Stage SCI: e.g., SCI-1st_Format_i_i A format in accordance with this embodiment may have no information about the time and the frequency resource allocation of the second stage because the time allocation of the first and second stages or parts of the SCI and the PSCCH, the data, is adjacent. Additionally, the frequency allocation, i.e., the number of sub-channels allocated for the data and the second stage SCI may be identical. The number of used sub-channels may be traced by the number of sub-channels occupied by the first stage. Hence the first stage decoding, for example by blind decoding or by DMRS scanning, may identify a length of the used sub-channels in the frequency domain. Further, a periodicity indicator, for example, indicator, maybe provided for indicating a periodic or aperiodic transmission or for indicating a resource release. The periodicity field may convey periodicity information is described in more detail below.

In an embodiment the search space field, that may be signaled via SIB/RRC as described above with reference to the first aspect, the subchannel size in frequency may not be given but only the number of symbols may be identified.

Hence, the length of the 1st stage may be identified, e.g., using DMRS scanning. A DMRS length decoded/identified by an RX UE may also indicate the length of the 1st stage in the frequency.

The format in accordance with this embodiment may identify the following items:

| Field (Item) | Bits | Reference |
|---|---|---|
| Physical channel indicator | 1 | 0: PSCCH/PSSCH<br>1: PSFICH |
| Frequency domain resource assignment | 0 | If this field is zero or absent, this indicates that $1^{st}$ and $2^{nd}$ + Data have the same frequency allocation. |
| Time domain resource assignment | 0 | If this field is zero or absent, this indicates that $1^{st}$ and $2^{nd}$ + Data have zero gap |
| Periodicity | 1 | If 0 (or all zeros) no repetitions or release continuous transmission<br>Else, quantized repetitions |
| Priority | 1/3 | 1 bit (0 low and 1 high)<br>3 bits (e.g., 8 PPPP priorities) |
| BC indicator | 1 | 0: Broadcast<br>1: UC/GC |
| New data indicator (NDI) or retransmission indicator | 1 | 0: new data and<br>1: retransmission |
| Retransmission gap | 1 | 0: no autonomous retransmission<br>1: autonomous retransmission is active and retransmission gap as per-configuration |

In this format, the size of the time and frequency domain is 0-bits, i.e., is not transmitted or is not part of the SCI message.

Figure 10:
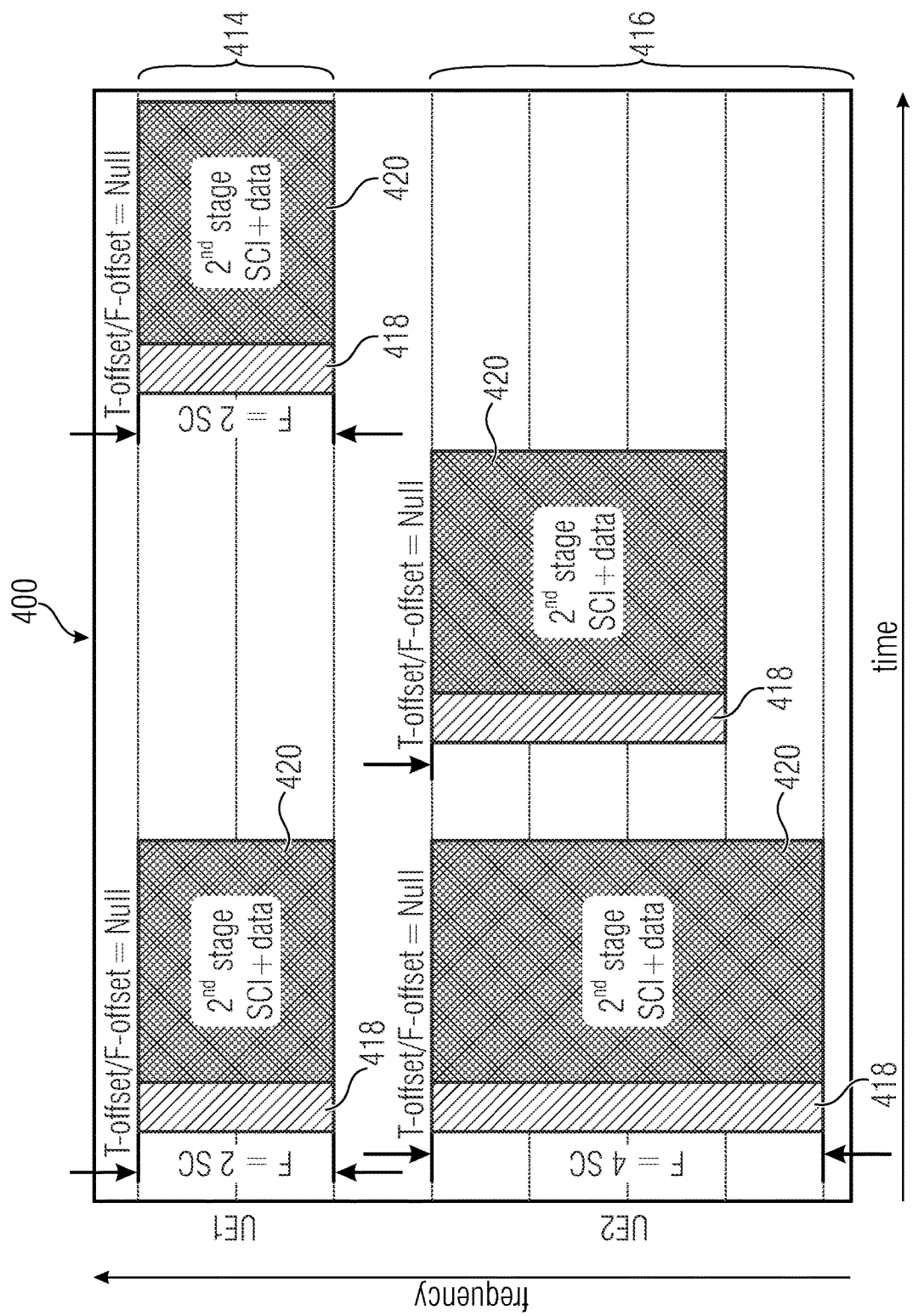
FIG. 10 illustrates an embodiment of the first short SCI first stage format where a time and a frequency of the data and the control are not identified in the first stage.

FIG. 10 illustrates an embodiment of the first short SCI first stage format where a time and a frequency of the data and the control are not identified in the first stage. FIG. 10 illustrates the sidelink resources 400 used for transmitting sidelink control messages and data. In the embodiment depicted in FIG. 10, the SCI and data for a first UE1 are transmitted in two sub-channels, and the respective SCI and data for a second UE2 are transmitted in four or three sub-channels 416. Each transmission of the respective UEs includes a first stage SCI 418 and a second stage SCI 420 that may include also the data to be transmitted by the UE1 to a receiving UE over the sidelink. The first stage 418 of the SCI is adjacent to the second stage SCI together with the associated data, i.e., the time offset, T-offset, and the frequency offset, F-offset, is zero or null so that the time offset field in the first stage SCI is set to zero. Thus, the above-described format does not require to include any bits for the time offset or the frequency offset. Thus, the format is reduced in size as the just-mentioned offsets need not to be indicated explicitly, rather, by definition the format_i_i has a time offset and a frequency offset of null or zero which is recognized by a receiving UE that, therefore, knows that the second stage SCI and the data follows in the same frequency bands immediately after the duration of the first stage SCI.

In this format, the duration of the transmission may be signaled earlier with an RRC/SIB message to all UEs.

Short Format 2 of the Sidelink 1st-Stage SCI: e.g., SCI-1st_Format_i_j

The format in accordance with this embodiment concerns an allocation of a first stage SCI to identify control or data coming with a time offset T. Thus, in addition to the short format 1 described above, the format of the present embodiment may include a longer periodicity field, for example having more than one bit, so as to consider a further reservation of resources for a transmission. Similar as in the above-described format_i_i, the periodicity field may be set to zero meaning that there is no periodic reservation of transmission resources needed or meaning that a reservation that has been made earlier may be released.

In accordance with further embodiments, as are described in more detail below with respect to the periodicity, the UE may reserve period or aperiodic resources for transmissions. For example, the UE may decide to send a first stage SCI every period P or the UE may decide to send one first stage every period at the beginning of a periodic transmission, or the UE may decide to occasionally send a refresh first stage SCI.

The first stage SCI or the first part of the SCI may indicate the following items:

| Field (Item) | Bits | Reference |
|---|---|---|
| Physical channel indicator | 1 | 0: PSCCH/PSSCH<br>1: PSFICH |
| Frequency domain resource assignment | 0 | If this field is zero or absent, this indicates that $1^{st}$ and $2^{nd}$ + Data have the same frequency allocation. |
| Time domain resource assignment | 2/3/4 | an on-going transmission,<br>Selects from a quantized table with offset asc onfigured by upper layers: e.g., SI1, SI2, SL4, SL6, SL8, . . . e.g., every |
| Periodicity | 1/2/3/ . . . | slot, every second slot, every fourth slot, . . .<br>If 0 (or all zeros) one shot transmission or release Else, quantized repetitions |
| Priority | 1/3 | 1 bit (0 low and 1 high)<br>3 bits (e.g., 8 PPPP priorities) |
| BC indicator | 1 | 0: Broadcast<br>1: UC/GC |
| New data indicator (NDI) or retransmission indicator | 1 | 0: new data and<br>1: retransmission |
| Retransmission gap | 1 | 0: no autonomous retransmission<br>1: autonomous retransmission is active and retransmission gap as per-configuration |

Figure 11:
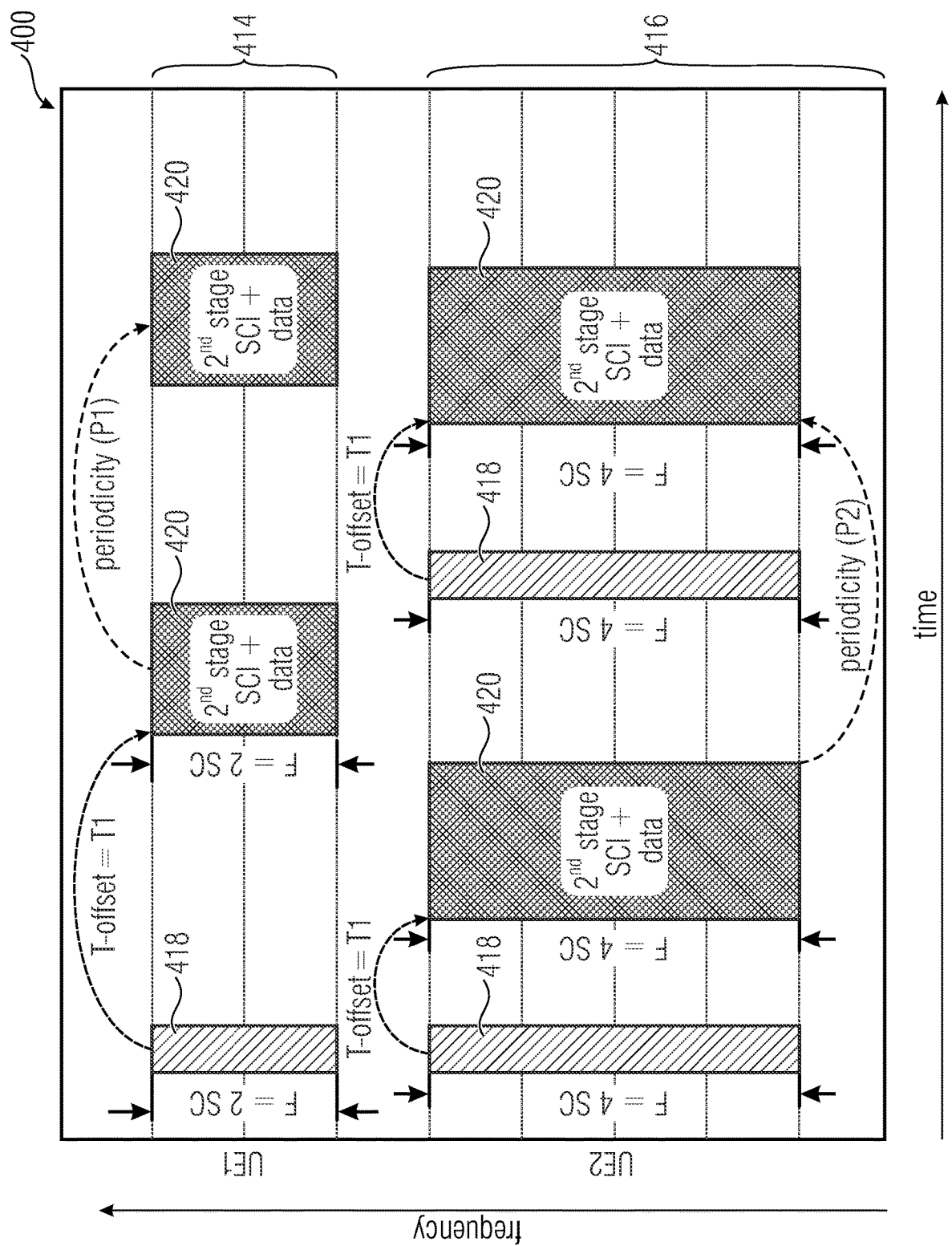
FIG. 11 illustrates an embodiment of the second short SCI first stage format where time and periodicity, P, for the second stage and the control may be identified within the first stage.

FIG. 11 illustrates an embodiment of the second short SCI first stage format where time and periodicity, P, for the second stage and the control may be identified within the first stage. FIG. 11, in a similar way as in FIG. 10, illustrates the sidelink resources 400 among which the two sub-channels 414 are used by UE1 and the sub-channels 416 are used by a UE2. In accordance with embodiments, as is described with reference to UE1, the first stage SCI 418 may indicate a time offset T-offset of T1 specifying a distance along the time domain between the first stage SCI 420 and the associated second stage SCI or data 420. In addition, the first stage SCI 418 sent by UE1 indicates a certain periodicity P1 indicating that the second stage SCI and the data 420 may be repeated with a certain periodicity, and in the example depicted in FIG. 11, the periodicity indicates that the second stage SCI and data 420 is repeated once after the second stage SCI and data. With regard to the UE2, a similar approach is described, however, also a first stage SCI is transmitted between the two occurrences of the second stage SCI and data.

In accordance with further embodiments, the short format may also include a sub-channel, SC, length in the frequency allocation field.

In this embodiment, the time domain resource assignment may include more than 1 bit, such that the offset time durations may be quantized and used as follows:
Slot1 (SI1): 1 slot,
Slot2 (SI2): 2 slots,
Slot4 (SI4): 4 slots.
Long Format 1 of the Sidelink 1st-Stage SCI: e.g., SCI-1st_Format_j_i In accordance with this embodiment, a longer format for the first stage SCI is supported so that, for example, more information about a DMRS pattern associated with the second stage or data may be provided. The DMRS pattern may be employed by the receiving UE for decoding the second stage SCI and the data.

The format in accordance with this embodiment may include a field for the frequency domain resource which may include a frequency domain resource assignment offset, F-offset, and a frequency domain resource assignment channel_length, F-length.

The F-offset may indicate the offset from the beginning of a resource pool sub-channel, for example from sub-channel zero, or from the beginning of a sub-channel in which the first stage SCI is located. For example, in case the first stage SCI does not span the entire sub-channels also spanned by the second stage, and in case the first and second stages the SCI overlap in the time domain, F-offset may have a negative value. The F-offset may indicate a starting point of the data.

The F-length may indicate the sub-channel lengths of the second stage in the data which may be possible.

The format in accordance with the present embodiment may indicate the following items:

In an embodiment, there may be a field for the Slot_duration identifying a slot duration, e.g., as number of symbols. The slot duration may depend on, e.g., a subcarrier spacing (SCS) or a frequency range (FR1<6/7 GHz or FR2>7 GHZ). The slot duration may be 1 or more bits quantizing possible slot durations, e.g., for a 2-bit Slot_duration: 00 means 14 symbols, 01 means 7 symbols, 10 means 4 symbols, and 11 means 2 symbols. The slot duration may also be indicated with any other format in the 1st stage SCI.

Further, in an embodiment, an Aggregated_slot/or slot_aggregation field may be provided so as to indicate a number of aggregated slots of data with a single control channel. For example, for a 2-bit Aggregated_slot/or slot_aggregation field 00 means a 1 slot transmission, 01 means a 2-slot aggregated transmission, 10 means a 4-slot aggregated transmission, . . . Other indication formats within the SCI first-stage may also be possible.

Figure 12:
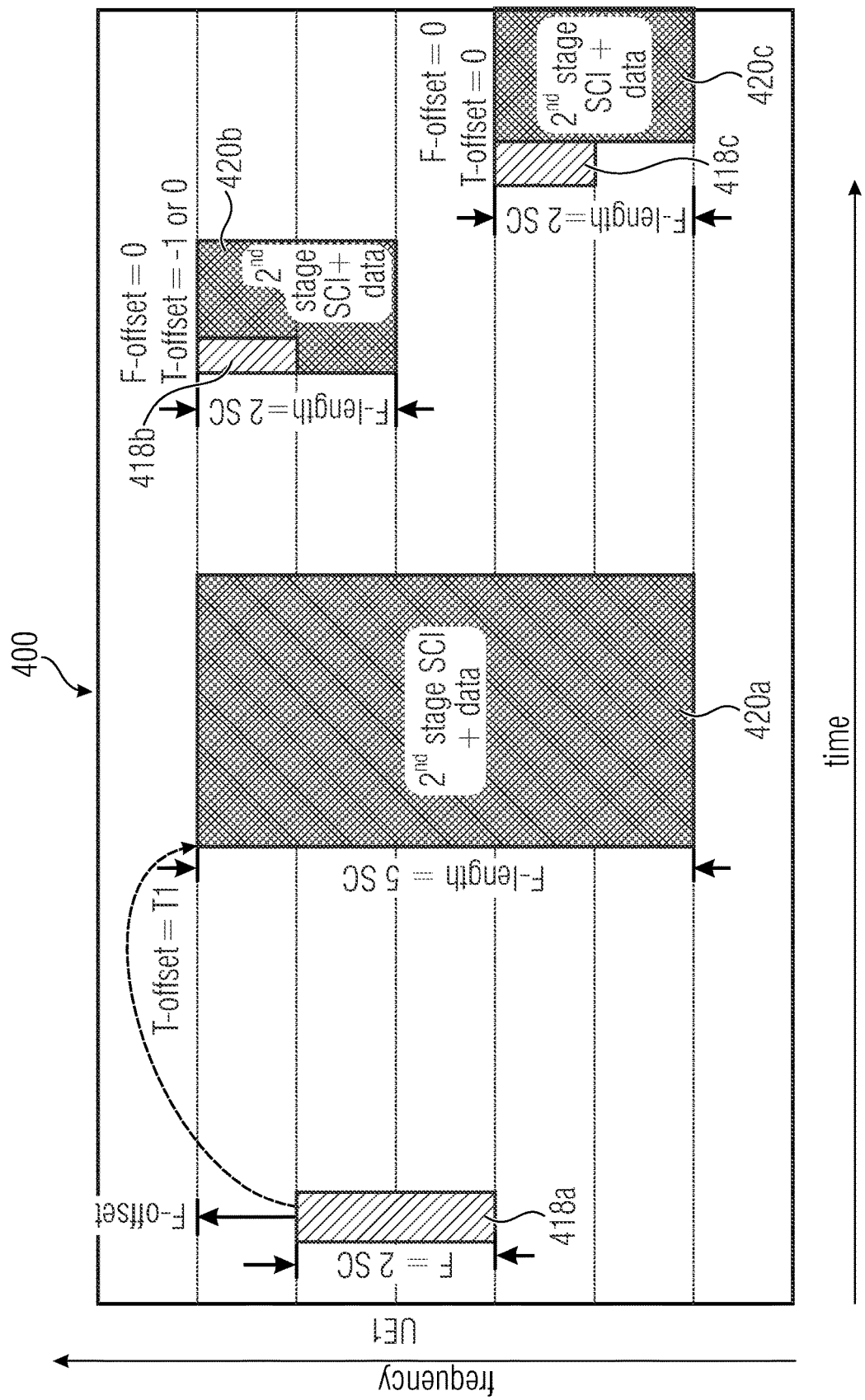
FIG. 12 illustrates an embodiment of a first long SCI first stage format where time, frequency and periodicity, P, for the second stage are identified in the first stage SCI.

FIG. 12 illustrates an embodiment of a first long SCI first stage format where time, frequency and periodicity, P, for the second stage are identified in the first stage SCI. In a similar way as FIG. 10 and FIG. 11, also FIG. 12 illustrates the sidelink resources 400 that are used by a $UE_1$ for transmitting data towards a receiving UE. At the left hand part of FIG. 12, a first stage SCI 418a is illustrated that occupies two sub-channels F=2SC. The first stage SCI 418a further signals to a receiving UE that a second stage SCI and the data 420a are provided with an offset in time, T-offset=T1, i.e., the first and second stage SCI are not adjacent, and, in addition, an offset in frequency, F-offset is signaled as +1 and −2 indicating to the receiving UE that the

| Field (Item) | Bits | Reference |
| --- | --- | --- |
| Physical channel indicator | 1 | 0: PSCCH/PSSCH<br>1: PSFICH |
| Frequency domain resource assignment.offset | 2/4/6/8* | Indicate the offset above or below the 1$^{st}$-SCI, i.e., +ve or −ve |
| Frequency domain resource assignment.Channel_Lenth | 2/4/6/8* | Indicate the length of the used subchannel starting from the offset |
| Time domain resource assignment | 2/3/4 | Selects from a quantized table with offset as configured by upper layers: Sl1, Sl2, SL4, SL6, SL8, . . . |
| Slot_duration -or- aggregated_slot | 2/3/4 | Defines:<br>1st: Slot duration (2, 4, 7, 14 symbols)<br>or<br>Number of aggregated slots: 00 (1 slot transmission), 01 (2-slot aggregated transmission), 10 (4-slot aggregated transmission), . . . so on |
| Periodicity | 1/2/3/ . . . | If 0 (or all zeros) no repetitions or release a continues transmission, Else, quantized repetitions |
| Priority | 1/3 | 1 bit (0 low and 1 high)<br>3 bits (e.g., 8 priorities) |
| BC indicator | 1 | 0: Broadcast<br>1: UC/GC |
| New data indicator (NDI) or retransmission indicator | 1 | 0: new data and<br>1: retransmission |
| Retransmission gap | 1 | 0: no autonomous retransmission<br>1: autonomous retransmission is active and retransmission gap as per-configuration |
| DMRS pattern in 2st SCI | 2 | If needed, a 2 bit maps different (up to 4) DMRS pattern for 2$^{nd}$ stage and PSSCH |
| CDM group and/or ports . . . . . . | 2 | For CDM group for 2$^{nd}$ stage and PSSCH |
| Destination ID | 8 | Used to identify Unicast and Group cast transmission. It is, e.g., all zeros in case of BC (i.e., BC ID) |
| Timing advance indicator(Mode 1) | 11 | Indicate the timing advance for mode 1 only (optional for mode 1 only) |

*The size of the bits of the frequency offset or SC Length may depend on the subcarrier spacing second stage SCI and data 420a has a F-length of five sub-channels F-length=5SC, and that, with respect to the sub-channels occupied by the first stage SCI 418a, the second stage SCI 420a spans two sub-channels preceding the starting sub-channel of the first stage SCI and uses an additional sub-channel following an end of the first stage SCI.

FIG. 12 shows a further example of the format of the present embodiment, in accordance with which the first stage SCI 418a and a second stage SCI and data 420b are adjacent in time and frequency. More specifically, the first stage SCI 418b signals to the receiving UE a F-offset of zero and a T-offset of −1 and 0 as well as a F-length of two sub-channels. In other words, based on this information, the UE that receives the transmission from the UE1, determines from the first stage SCI 418b that the second stage SCI and the data 42b follow immediately the first stage SCI in the first subband and that the first stage SCI and the second stage SCI overlap in the second subband as is illustrated in FIG. 12.

A further embodiment of the format in accordance with the present embodiment is described also in FIG. 12 including a first stage 418c and a second stage SCI and data 420c which is similar to the SCI stages 418b and 420 described above except that the time offset is zero for both subbands, i.e., in the second subband, not covered by the first SCI the second SCI starts also once the first stage SCI terminated. Long Format 2 of the Sidelink 1st-Stage SCI: e.g., SCI-1st_Format_i_j The format in accordance with this embodiment allows to cross schedule for different SL resource pools, SL BWPs including the resource pools, SL carriers for multi-carriers. This format defines a field including a resource pool ID, a BWP ID or a carrier ID. On the basis of the just-mentioned ID, the receiving UE may compute the frequency domain resource assignment offset, F-offset, and the frequency domain resource assignment channel lengths, F-lengths.

The format in accordance with this embodiment may signal in the first stage the following information.

| Field (Item) | Bits | Reference |
|---|---|---|
| Physical channel indicator | 1 | 0: PSCCH/PSSCH<br>1: PSFICH |
| Resource Pool ID/BWP ID/Carrier ID | 4 bits | All zeros is the same Pool/BWP/Carrier 0001, Pool/BWP/Carrier 1 (and so on) |
| Frequency domain resource assignment.offset | 2/4/6/8 | Indicate the offset above or below the $1^{st}$-SCI, i.e., +ve or −ve |
| Frequency domain resource assignment.Channel_Lenth | 2/4/6/8* | Indicate the length of the used subchannel starting from the offset |
| Time domain resource assignment | 4 | Selects from a quantized table with offset as configured by upper layers: Sl1, Sl2, SL4, SL6, SL8, . . . |
| Periodicity | 1/2/3/ . . . | If 0 (or all zeros) no repetitions or release a continues transmission, Else, quantized repetitions |
| Priority | 1 / 3 | 1 bit (0 low and 1 high)<br>3 bits (e.g., 8 PPPP priorities) |
| BC indicator | 1 | 0: Broadcast<br>1: UC/GC |
| New data indicator (NDI) or retransmission indicator | 1 | 0: new data and<br>1: retransmission |
| Retransmission gap | 1 | 0: no autonomous retransmission<br>1: autonomous retransmission is active and retransmission gap as per-configuration |
| DMRS pattern in 2st SCI | 2 | If needed, a 2 bit maps different (up to 4) DMRS pattern for $2^{nd}$ stage and PSSCH |
| CDM group and/or ports | 2 | For CDM group for $2^{nd}$ stage and PSSCH |
| Destination ID | 8 | Used to identify Unicast and Group cast transmission. It is, e.g., all zeros in case of BC (i.e., BC ID) |
| Timing advance indicator(Mode 1) | 11 | Indicate the timing advance for mode 1 only (optional for mode 1 only) |

Figure 13:
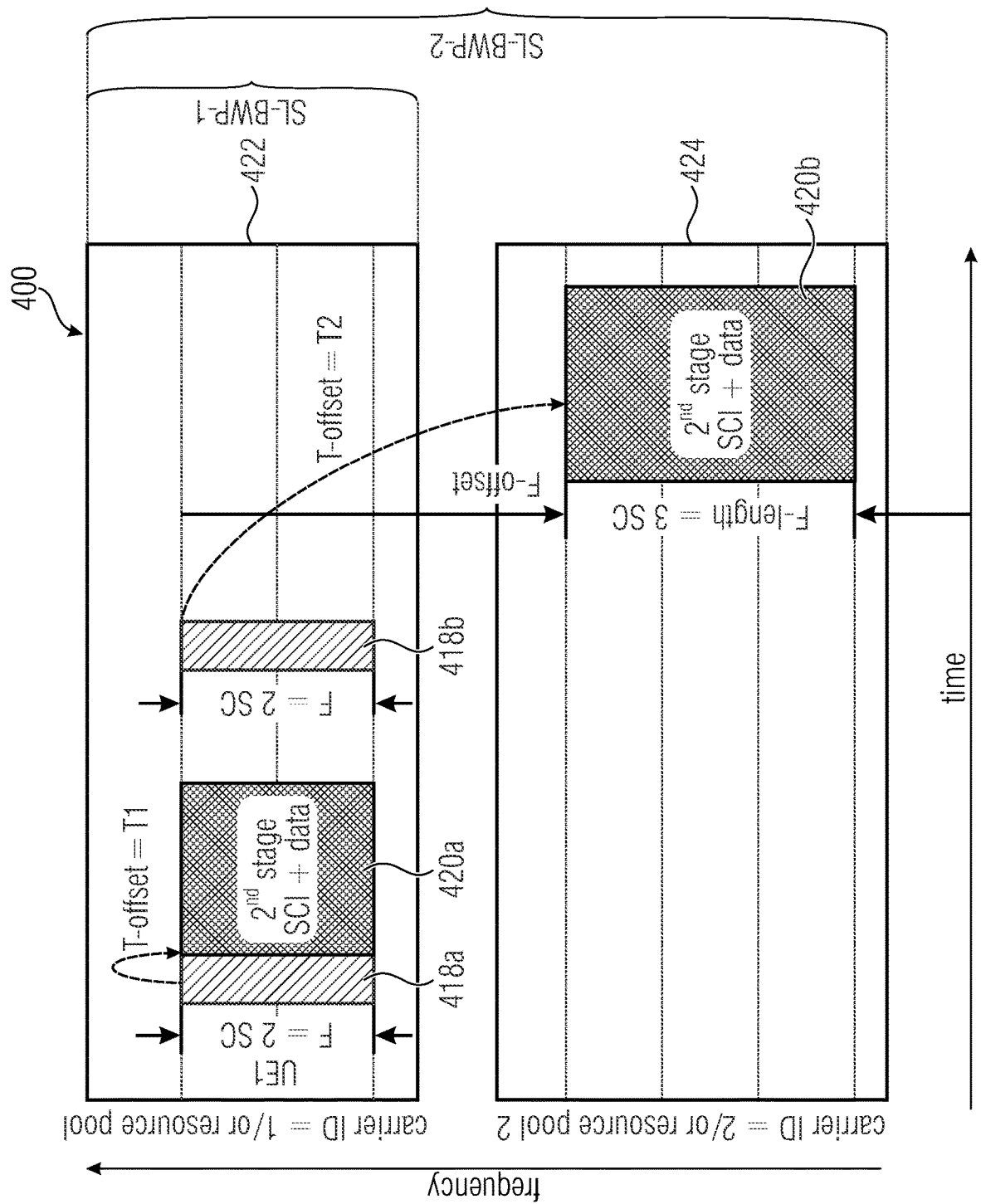
FIG. 13 illustrates an embodiment of the long format described above with a cross carrier/BWP/resource pool scheduling or the second stage SCI and data that is included in the first stage SCI.

*The size of the bits of the frequency offset or SC Length may depend on the subcarrier spacing FIG. 13 illustrates an embodiment of the long format described above with a cross carrier/BWP/resource pool scheduling or the second stage SCI and data that is included in the first stage SCI. FIG. 13 illustrates a first example in which a first stage SCI 418a and a second stage SCI and data 420a are in the same resource pool 422, and this may be signaled by the first stage SCI 418a in a way as described above. FIG. 13 illustrates a further embodiment in which a first stage SCI 418b indicates that the second stage SCI and data 420b uses resources in a different resource pool, namely resource pool 424. In the depicted embodiment, the information in the first SCI 418b indicates the F-lengths of the second stage SCI and data to be three sub-channels, F-length=3SC, and further, the offset in frequency, i.e., F-offset is signaled, and the offset is selected such that the sub-channels used by the second stage are within the second resource pool 424 or within the second bandwidth part. Also a time offset, T-offset=T2 is signaled.

In accordance with embodiments, a CRC, for example of 16 or 24 bits, may be added to any of the above-described formats, advantageously for the above-described long SCI first stage formats.

In accordance with further embodiments, one or more of the above-described formats may provide for multi UE multiplexing, for example via CDM, so as to reduce interference in the control channel.

In accordance with yet further embodiments, one or more of the above-described formats may include a destination ID, like a UE ID, a group ID, or a broadcast ID that is scrambled with the CRC of the formats so as to allow the receiving UE to identify from the format of the first stage SCI whether the communication is a unicast communication, a group cast communication or broadcast communication by the transmitting UE.

Periodicity

As mentioned above, in accordance with further embodiments of the second aspect of the present invention, the first stage SCI may indicate a periodicity. The periodicity may be indicated by a variable number of bits, and may be provided for assisting the sensing and the reservation mechanism in the sidelink. The periodicity field, also referred to as per-sistence field, is signaled with the first stage SCI. In case the periodicity field indicates a 0, this may mean that a single short transmission occurs without any periodicity, or that a previously set periodicity and associated resources that have been reserved, are released. The periodicity may be indicated as per quantized value indicated for each look-up table entry.

Once the reservation is waived, i.e., once the periodicity indicates, for example, a value of 0, the freed resources may be used by other UEs.

In accordance with embodiments, the periodicity may be signaled as shown in the following tables for a 1 bit periodicity field, a 2 bit periodicity field, a 3 bit periodicity field and X-bits periodicity field.

1 Bit:

| | |
|---|---|
| 0 | No periodicity (1-shot), or Release further reservation (may be last data or a 1$^{st}$ stage sent to release reservation. |
| 1 | Expect periodicity on the same associated frequency. Hence, advanced sensing is supported for resource reservation prediction. |

2 Bits:

| | |
|---|---|
| 00 | No periodicity (1-shot), or Release further reservation (may be last data or a 1st stage sent to release reservation. |
| 01 | Expect periodicity less than x ms (e.g., less than or equal 5 ms) |
| 10 | Expect periodicity less than x ms (e.g., less than or equal 10 ms) |
| 11 | Expect periodicity less than x ms (e.g., less than or equal 50 ms) |

3 Bits:

| | |
|---|---|
| 000 | No periodicity (1-shot), or Release further reservation (may be last data or a 1st stage sent to release reservation. |
| 001 | Expect periodicity less than x ms (e.g., less than or equal 2 ms) |
| 010 | Expect periodicity less than x ms (e.g., less than or equal 5 ms) |
| 011 | Expect periodicity less than x ms (e.g., less than or equal 10 ms) |
| 100 | Expect periodicity less than x ms (e.g., less than or equal 20 ms) |
| 101 | Expect periodicity less than x ms (e.g., less than or equal 40 ms) |
| 110 | Expect periodicity less than x ms (e.g., less than or equal 60 ms) |
| 111 | Expect periodicity less than x ms (e.g., less than or equal 100 ms) |

X-Bits

| | |
|---|---|
| All X-bits are zeros | No periodicity (1-shot), or Release further reservation (may be last data or a 1st stage sent to release reservation. |
| Other: | Quantize periodicity as per RRC configuration enumerations, e.g.: Slot1 (every slot), Slot2 (every second slot), Slot4 (every 4th slot), ... | where:
Slot1: Reservation every slot,
Slot2: Reservation every second slot,
Slot4: Reservation every 4 slots,
Slot5: Reservation every 5 slots,
Slot8: Reservation every 8 slots, and
any other combination, for example, a 4 bits field may quantize 16 different durations/periodicities and an 8 bit field may quantize 256 different durations/periodicities.

Figure 14:
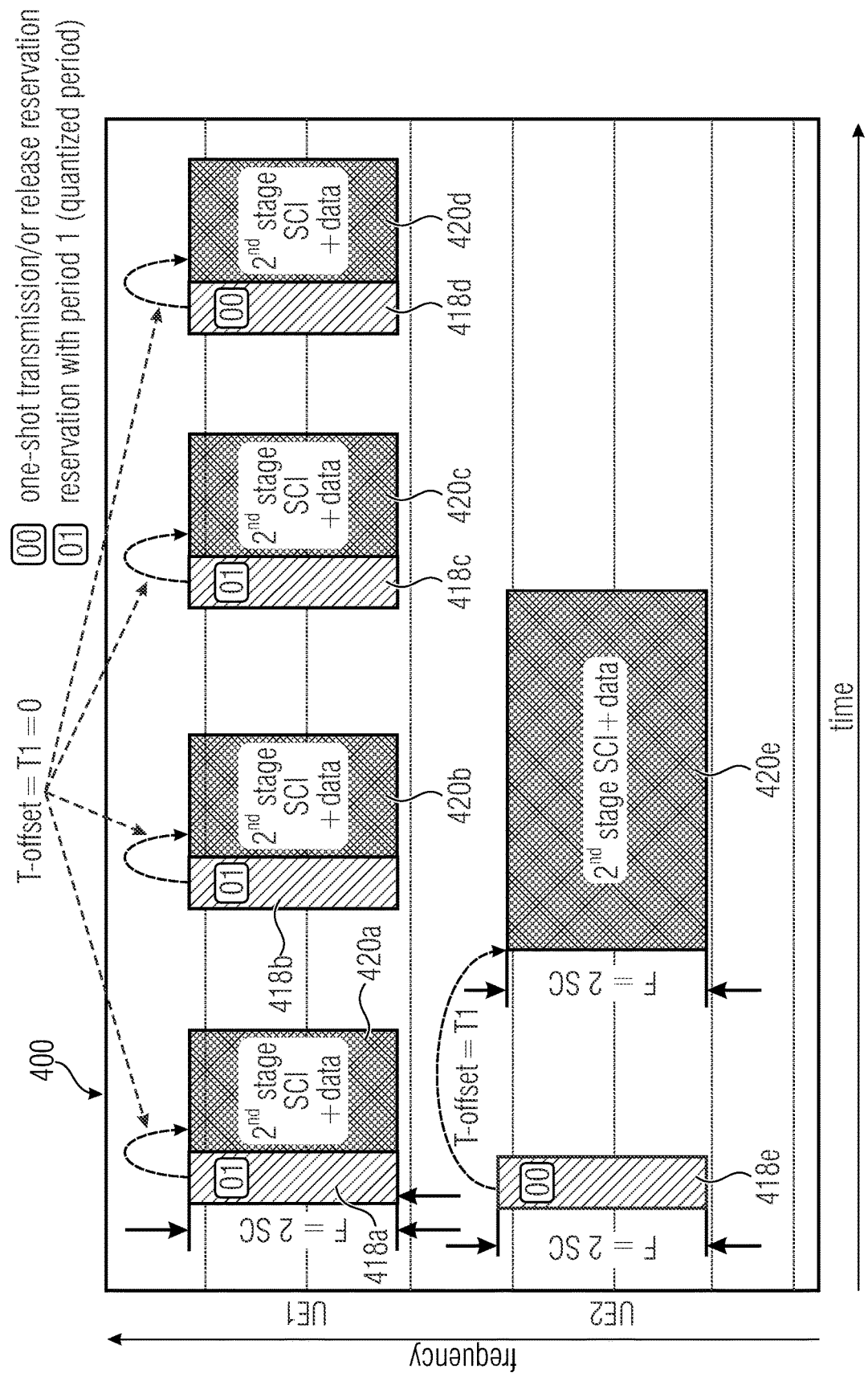
FIG. 14 illustrates an embodiment of the second aspect concerning the periodicity reservation and release using a periodicity field that is provided in the first stage SCI.

FIG. 14 illustrates an embodiment of the second aspect concerning the periodicity reservation and release using a periodicity field that is provided in the first stage SCI. Again, the sidelink resources 400 to be used for a sidelink communication among user devices is illustrated schematically at 400, and a first UE, that is transmitting the SCI and the data to a receiving UE is assumed to provide the first and second stage SCI and the data in two adjacent sub-channels, F=2SC. The first stage SCI 418a to the first stage SCI 418c indicate a time offset, T-offset=1T=0, i.e., the second stage 420a to 420c follow immediately in time the first stage SCI. The first stage SCI further includes the periodicity field having a value of "01" signaling to the receiving UE that the second stage resources are reserved with a period of 1, also referred to as a quantized period. The fourth first stage SCI 418d includes a periodicity field having a value "00" meaning that a one shot transmission occurs or that the resources reserved so far for the second stage are released.

FIG. 14 shows a further example, for a second UE$_2$ in which a first stage SCI 418e indicates a time offset T1 between the first stage 418e and the second stage SCI 420e. Further, the periodicity field indicates a value "00", meaning that the transmission is a one shot transmission.

In accordance with further embodiments, the periodicity field may be used in the first stage SCI to indicate all upcoming second stage SCIs and data occurrences associated with the first stage. The data or second stage SCI may come every periodicity. The receiving UE, in such an embodiment, receives one first stage SCI, for example the first transmitted first stage SCI, that is to be decoded once by the receiving UE, and for subsequent transmissions of data the UE does not expect any further first stage SCIs.

In accordance with embodiments, the transmitting UE may send multiple first stage SCIs so as to reduce a sensing ambiguity of the receiving UEs in case the decoding of the stage SCI that has been transmitted first, is not successful. For example, receiving UEs that did not decode correctly any of the retransmissions of the first stage SCI may rely on the information for further decoding the second stage data and control obtained from the first transmission of the first stage SCI.

Third Aspect

In accordance with embodiments of a third aspect of the present invention, the first stage SCI may be accompanied by a certain reference signal, like a DMRS, having a certain pattern and/or position. For example, the first stage of the SCI or the first part of the SCI may be accompanied by a DMRS so as to indicate, in accordance with embodiments, to a receiving UE a cast type of the associated second stage SCI. In accordance with other embodiments, the first stage of the SCI or the first part of the SCI may be accompanied by a DMRS pattern associated with certain use-cases with certain QoS of the second part of the sidelink control message.

The DMRS design or pattern may be such that a receiving UE is protected from collisions with other UEs. The DMRS design may be associated with different 1st SCI formats for conveying certain information about, e.g., a size of the first stage SCI in time and frequency domain, like the length of the DMRS in frequency is the length of the first stage, unless the length in frequency is not conveyed in the search space.

Thus, in accordance with embodiments of the third aspect, the receiving UE may identify from a first part of a sidelink control message a reference signal, e.g., the mentioned demodulation reference signal, DMRS, pattern. A transmitting UE or another network entity involved in the SL communication, like a gNB, may signal to a receiving UE or a group of receiving UEs in or together with the first part of the sidelink control message the reference signal selected so as to convey information to the receiving UE.

In accordance with embodiments, the DMRS defined in Rel-15 NR Uu may be considered a starting point for the NR sidelink DMRS design. In Rel-15 NR Uu, two types of DMRS configurations, both for PUSCH and PDSCH, are defined, namely the type-1 and the type-2 DMRS configuration. These types begin with one or two symbols and are followed, optionally, by at most three additional DMRS symbols depending on the configuration types. Considering the number of DMRS symbols needed to enable a sufficient performance in a low SNR regime, the DMRS type 1 ensures a sufficient number of DMRS REs per PRB and, in accordance with embodiments, is a PSCCH DMRS structure for the first stage SCI. The DMRS structure for the first stage SCI may be received via higher layer signaling, for example by providing a parameter "SL-DMRS-configure-type", or it may be received by a master information block, MIB, or a system information block, SIB. In accordance with further embodiments, other parameters, like a DMRS position and a DMRS maximum length may be configured in a similar way. Although the configuration considers only one layer, it is noted that the invention is not limited to such a one layer configuration, rather it is equally applicable to a multilayer configuration.

In accordance with embodiments, to reduce blind decoding processing time when identifying the first stage of the SCI by a receiving UE, the DMRS pattern may be selected dependent on the selected subcarrier frequency mapping, the selected subcarrier time mapping, the orthogonal or quasi orthogonal codes or different code generators or code division multiplexing, CDM.

In case a UE is configured by a higher signaling message or a broadcast information, such as the SIB, the position of the DMRS for different patterns may be computed in a way as described in more detail below. The higher signaling message may be the SIB 18/19/21/26 defined for LTE-V2X or another newly defined SIB for NR V2X. In accordance with other embodiments, the DRMS may be defined by an information element named PSCCH-config which may be used to configure UE specific PSCCH parameters per bandwidth part, and FIG. 15 illustrates an embodiment for such a PSCCH-config-common information element. In the information element depicted in FIG. 15, SL-dmrs_control_type_x or SL-dmrs_control_type_y_x may contain all positions in time and/or in frequency, SL-dmrs_control_type_1 may be used for broadcast, and SL-dmrs_control_type_2_1/SL-dmrs_control_2_2 may be used for unicast and/or groupcast.

FIG. 16 illustrates an embodiment of a PSCCH-config-UE specific information element, also for a common PSCCH in which SL-controlResourceSetToAddModList or SL-controlResourceSetToRelaseModList allow the UE to add or release a search space from the specific search space, the DMRS types are as before, and, if the additionalV2XDMRS field is present, the UE enables DMRS patterns per subcarrier spacing. This is applicable to all formats of PSCCH. This also includes the possibility to have denser DMRS for high speed scenarios as described in more detail below.

In accordance with embodiments, different DMRS patterns may be based on different times/frequencies. For example, a certain DMRS pattern may identify a cast type. In other words, the DMRS may have a pattern that is associated with a certain cast type of the second part of the sidelink control message. In accordance with embodiments, the DMRS may be selected from a plurality of reference signals, like DMRs, having pattern being different from each other so that each of the plurality of DMRSs is associated with a certain cast type. The DMRS may differ in one or more of
- the frequency domain,
- the time domain,
- the code domain, like different orthogonal or quasi-orthogonal coding schemes or code division multiplexing (CDM),
- the space domain, like different port IDs.

Figure 17:
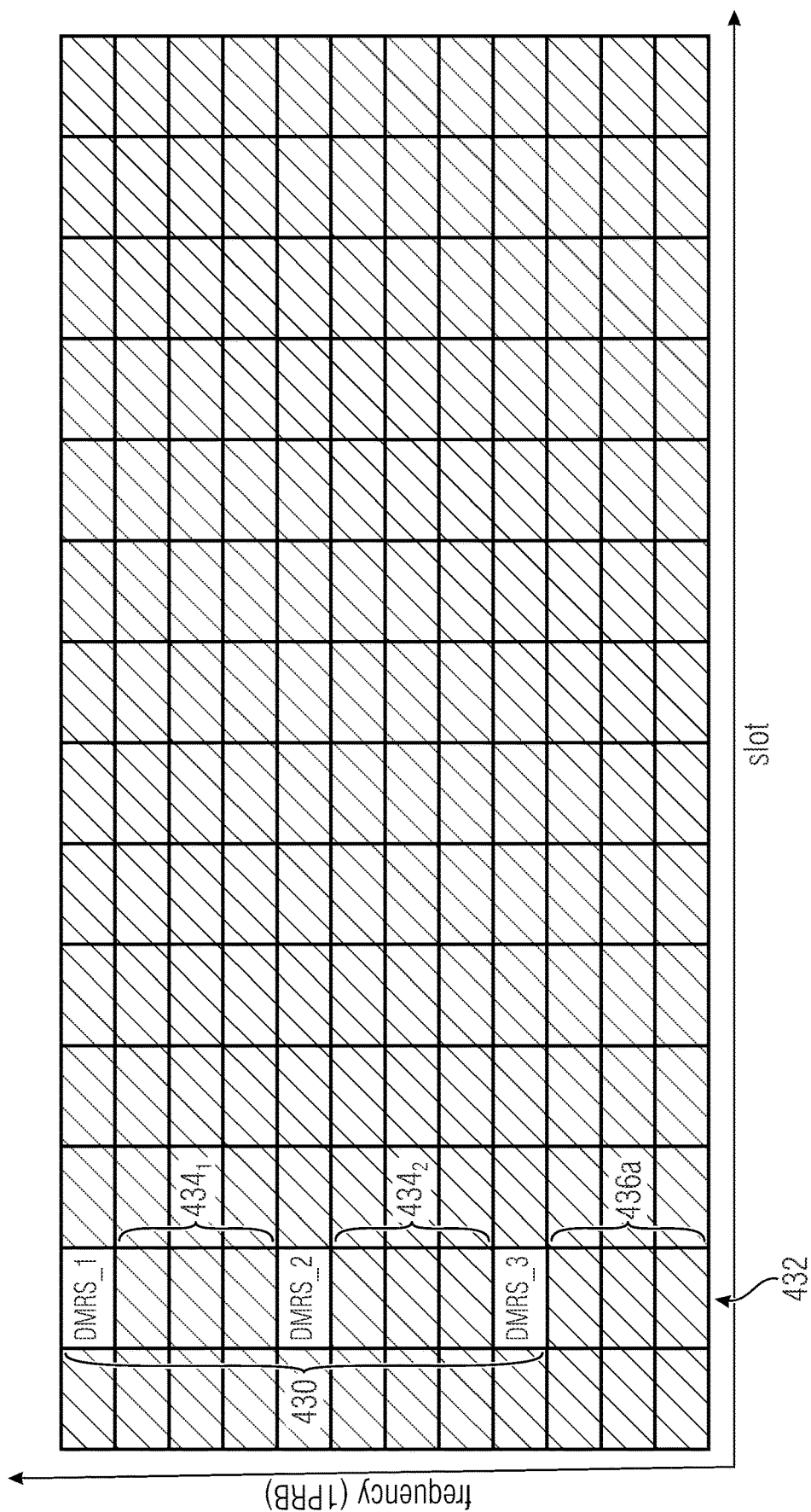
FIG. 17 illustrates a DMRS pattern for a 1st stage SCI type identifying a broadcast communication.
Figure 18:
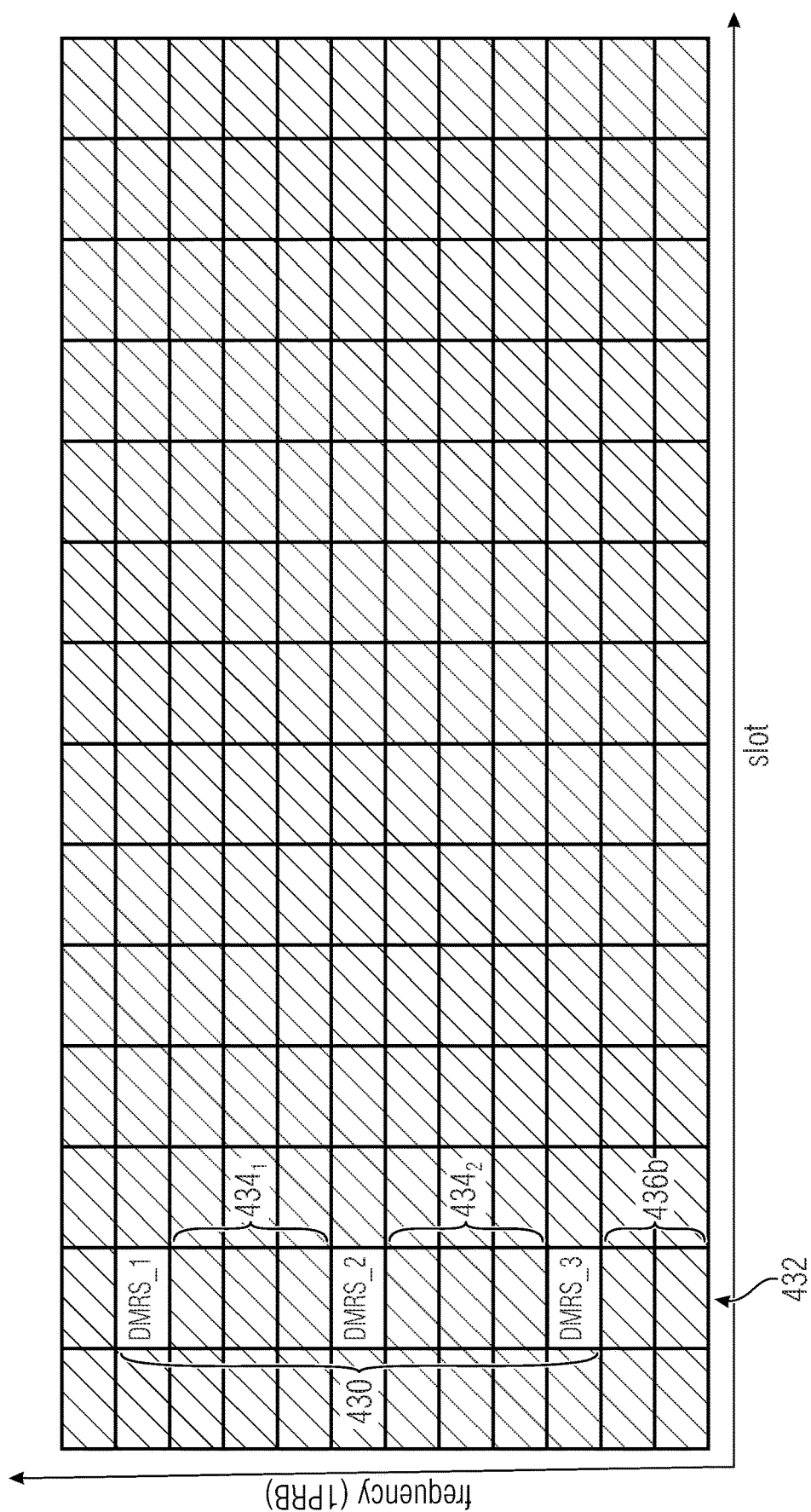
FIG. 18 illustrates a DMRS pattern for a 1st stage SCI type identifying a unicast communication.
Figure 19:
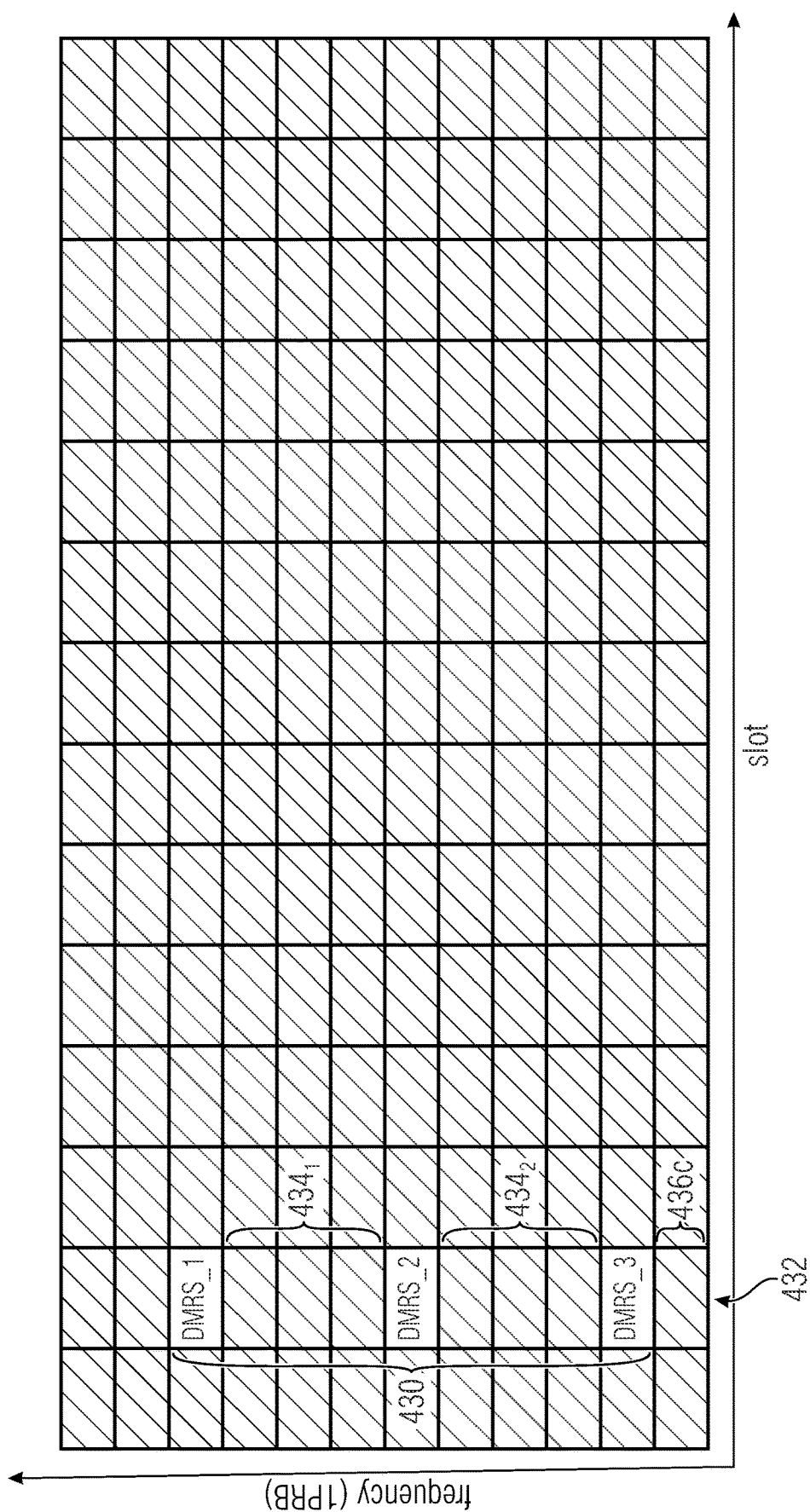
FIG. 19 illustrates a DMRS pattern for a 1st stage SCI type identifying a groupcast or multicast communication.

FIG. 17, FIG. 18 and FIG. 19 illustrate embodiments of DMRS patterns for different first stage SCI types, i.e., the cast type and the first stage SCI is conveyed in one symbol, for example the second symbol. The cast type, in the depicted embodiments, may be identified by a DMRS pattern having DMRSs located in three subchannels in the second symbol that are separated in the frequency domain by two subchannels. To distinguish the cast types, a DMRS patters has a certain frequency offset from the start of the PRB.

FIG. 17 illustrates a DMRS pattern for a 1st stage SCI type identifying a broadcast communication. The position of the DMRS in time or frequency is set by upper layers, e.g., by the parameter SL-dmrs_control_type_xx. FIG. 17 illustrates a DMRS pattern 430 having DMRS_1, DMRS_2 and DMRS_3 located in the three subchannels in the second symbol 432 that are separated in the frequency domain by two subchannels 4341, 4342. The DMRS pattern 430 has a frequency offset 436a of three subchannels in the frequency domain indicating a broadcast communication. A UE recognizes from the DMRS pattern 430 and the offset 436a that the cast type of the first stage SCI is broadcast.

FIG. 18 illustrates a DMRS pattern for a 1st stage SCI type identifying a unicast communication. The position of the DMRS in time or frequency is set by upper layers, e.g., by the parameter SL-dmrs_control_type_xx. FIG. 18 illustrates the same DMRS pattern 430 as in FIG. 17 but with a frequency offset 436b of two subchannels in the frequency domain, thereby indicating a unicast communication. A UE recognizes from the DMRS pattern 430 and the offset 436b that the cast type of the first stage SCI is unicast.

FIG. 19 illustrates a DMRS pattern for a 1st stage SCI type identifying a multicast or groupcast communication. The position of the DMRS in time or frequency is set by upper layers, e.g., by the parameter SL-dmrs_control_type_xx. FIG. 19 illustrates the same DMRS pattern 430 as in FIG. 17 or in FIG. 18 but with a frequency offset 436c of one subchannel in the frequency domain, thereby indicating a multicast or groupcast communication. A UE recognizes from the DMRS pattern 430 and the offset 436c that the cast type of the first stage SCI is multicast or groupcast.

The positions in time and frequency may be configured using any of the fields, for example, the SIB/RRC fields SL-dmrs_control_type_1, SL-dmrs_control_type_2_1/2, or any other field defined by upper layer parameters in RRC and/or SIB.

In accordance with further embodiments, as briefly mentioned above, the DMRS patterns may differ in the coding domain and the space domain (antenna ports). For example, the DMRS may be based on code division multiplexing, CDM. A variable or configurable DMRS pattern for a data demodulation may be supported. For example, a configuration may support a front loaded DMRS pattern. A front loaded DMRS may be mapped over one or two adjacent OFDM symbols. In accordance with other embodiments, a DMRS may be configured for a later part of the slot.

The DMRS configuration may be up to a maximum number of DMRS ports. For example, eight orthogonal DL DMRS patterns may be supported for a single user MIMO, SU-MIMO, e.g., the configuration type 1 may be used, and a maximum of 12 orthogonal DL DMRS ports may be supported for multiuser MIMO, MU-MIMO, using for example, the configuration type 2. For CP-OFDM, NR may support a common DMRS structure for DL and UL, and the DMRS location and DMRS pattern may be the same or different.

The DMRS for the respective links may be configured to be orthogonal or quasi-orthogonal to each other. For DL DMRS port multiplexing, FDM, including comp, CDM including OCC and cyclic shift, and TDM are considered. In other words, some or all of the plurality of reference signals may have a unique design, e.g., orthogonal or quasi-orthogonal DMRS patterns, that allows to protect a receiving UE from collisions.

PN sequences that are supported in 3GPP may be used to generate a DMRS parameter, for example, by considering the configuration type 1 for PUSCH, as is described in reference [2]. This identifies the positions in time and frequency so as to generate cast specific DMRS identifying whether a transmission is for a broadcast, for a unicast or for a groupcast.

For example, according to Rel-15 New Radio, the DMRS resource mapping is done as follows:

$$a_{k,l}^{(p,n)} = \beta_{PDSCH}^{DMRS} w_f(k') w_t(l') r(2n+k') \quad (1)$$

$$k = \begin{cases} 4n + 2k' + \Delta & \text{Configuration type 1} \\ 6n + k' + \Delta & \text{Configuration type 2} \end{cases}$$

$$k' = 0.1$$

$$l = \bar{l} + l'$$

$$n = 0, 1,$$

wherein
$w_t(l')$, $w_f(k')$ and $\Delta$ are given by Tables 7.4.1.1.2-1, 7.4.1.1.2-2 in reference [2],
k represents frequency domain location,
l represent time domain location,
r(.) is a sequence generation method, and
μ and P are the subcarrier spacing index (numerology) and the number of layers or antenna ports, respectively.

Embodiments of the third aspect employ the above to provide for an additional degree of freedom for determining DMRS patterns corresponding to the different cast communications at the 1$^{st}$ stage SCI, e.g., broadcast, unicast or group/multicast. An example of deterministic DMRS patterns obtained in accordance with this embodiment is indicated in the table below, however, other patterns are not precluded. The parameters P, CDM group, k', l' and Δ given in Table 3 are configured by:
higher layer signaling in connected mode, i.e. RRC, or SIB in idle mode.

TABLE

Illustrative example of CDM pattern and DMRS parameter for difference cast type

| | P (antenna port) | CDM group | Δ | $w_f(k')$ | | $w_t(l')$ | |
|---|---|---|---|---|---|---|---|
| | | | | k' = 0 | k' = 1 | l' = 0 | l' = 1 |
| UpdatedBroadcast Pattern | 0 | 0 | 0 | +1 | +1 | +1 | −1 |
| Unicast Pattern | 1 | 0 | 2 | +1 | −1 | +1 | −1 |
| Multicast Pattern | 1 | 1 | 2 | +1 | +1 | +1 | −1 |

In accordance with further embodiments of the third aspect, a DMRS pattern may be repeated over the time domain, for example in case of user scenarios in which the users are moving fast. For example when considering a high speed scenario, for example in cases where the relative velocity is 500 km/h, a coherence time may be less than a symbol duration in the upper band frequency of FR1. For example, the symbol duration may be 0.005 ms at fc=3.6 GHz with a subcarrier spacing of 30 kHz, so that more DMRS signals may be needed to perform a channel estimation, as is described, for example, in reference [3].

Figure 20:
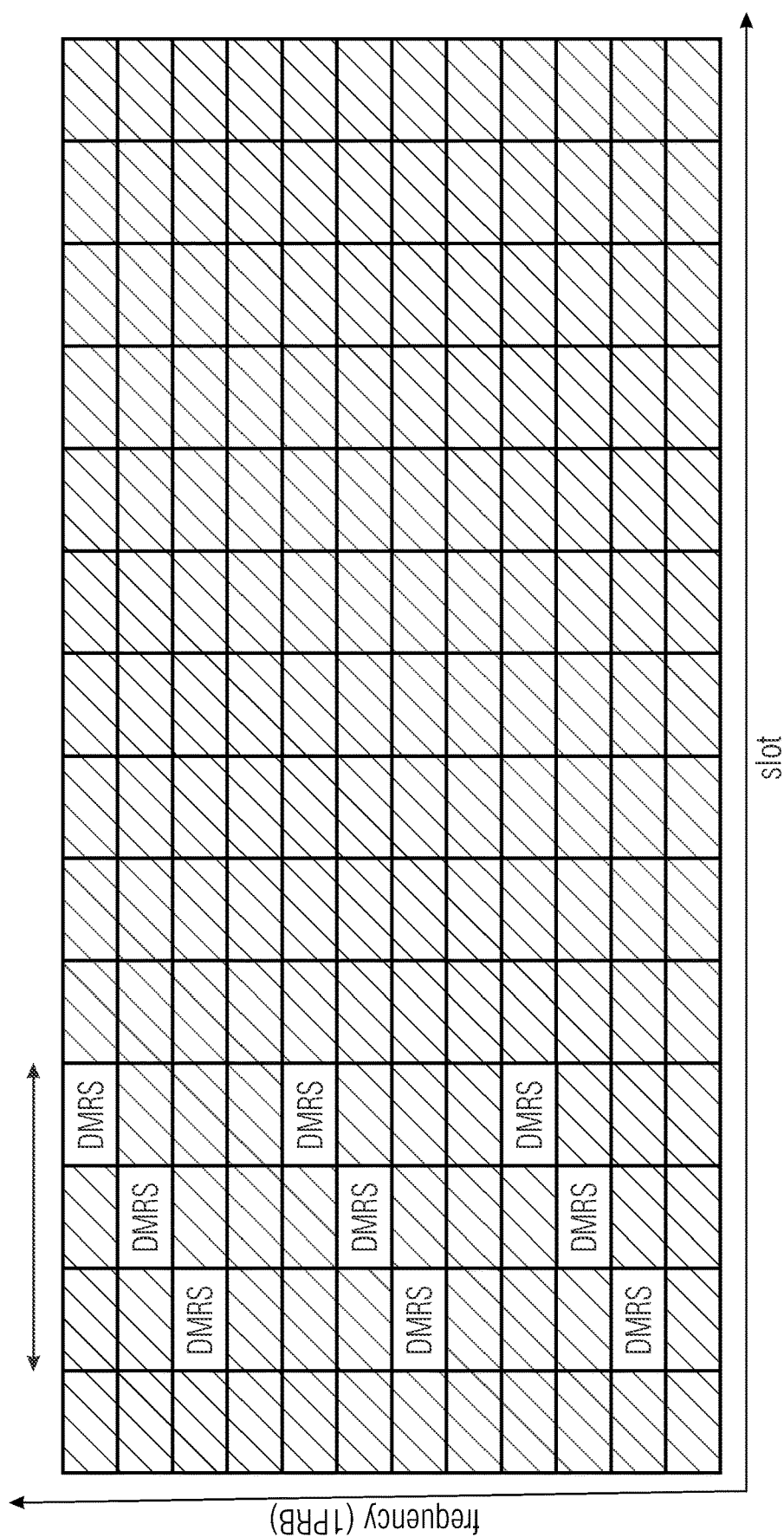
FIG. 20 illustrates an embodiment using a DMRS shift of a frequency and/or time for different cast types.

To address this issue, in accordance with embodiments, the DMRS patterns may be mapped to one or more of the symbols of the first stage SCI. For example, a DMRS may be mapped to every symbol of the first stage SCI based on a specific time pattern algorithm corresponding to the cast type communication. According to other embodiments, a certain pattern for mapping the DMRS to the first stage SCI may be employed. FIG. 20 illustrates an embodiment using a DMRS shift of a frequency and/or time for different cast types.

In accordance with embodiments, DMRS symbols may only be provided in a subset of the PSCCH symbols in the time domain, so that all DMRS symbols or a subset of the DMRS symbols may be in a first stage SCI associated with the PSCCH. In other embodiment, a different number of symbols may be provided for the PSCCH, for example, 1, 2, 3, 4 and up to 14 symbols, wherein all the symbols may be associated with a different DMRS configuration. In yet another embodiment, in case more than one DMRS symbol is used in a first stage SCI in a PSCCH, different DRMS configurations may be applied. In another embodiment, the density of the DMRS time-symbols may be increased, using, for example an additional field "additional V2X DMRS" as shown in FIG. 15, for example for a high speed scenario.

Fourth Aspect

In accordance with embodiments of a fourth aspect of the present invention, a receiving UE may determine from the first part of the sidelink control message whether the sidelink control message is intended for the UE. A transmitting UE or another network entity involved in the SL communication, like a gNB, may signal to a receiving UE or a group of receiving UEs in or together in the first part of the sidelink control message whether the sidelink control message is intended for a receiving UE. For example, this may be signaled by identifying in the first stage SCI or the first part of the sidelink control message a cast type of the transmission associated with the SCI.

For example, a receiving UE does not expect the second part of the sidelink, i.e., the second part is not intended for the UE and the UE will not perform decoding or the like of the second part, for example in case the first part of the sidelink message includes a broadcast ID, like a broadcast flag or a broadcast bit for identification of the type of communication, or the first part of the sidelink message does not include a broadcast ID and does not include any UE destination ID, indicating, e.g., a unicast communication, or group destination ID, indicating, e.g., a groupcast communication, or a UE destination ID or a group destination ID in the first part of the sidelink message does not match an ID of the UE.

On the other hand, in case the first part of the sidelink message includes a UE destination ID or a group destination ID that matches an ID of the UE and does not include a broadcast ID the UE may expect the second part of the sidelink, i.e., process the second part, e.g., decode it and use the information and/or data provided therein.

In accordance with other embodiments, the sidelink control message may be scrambled, e.g., using CRC scrambling, with a UE destination ID or a group destination ID or a broadcast ID, and the UE does not expect the second part of the sidelink in case a descrambling yields one or more of:

a broadcast ID, like a broadcast flag or a broadcast bit, or neither a broadcast ID nor any UE destination ID nor any group destination ID, or a UE destination ID or a group destination ID does not match an ID of the UE, and On the other hand, in case the descrambling yields a UE destination ID or a group destination ID that matches an ID of the UE and does not include a broadcast ID, the UE may expect the second part of the sidelink.

Thus, in accordance with embodiments, the cast type may be signaled via a destination ID, either via a direct signaling in the first stage SCI or by CRC scrambling of the SCI with the destination ID, as described above. The cast types unicast or groupcast may be derived from a group destination ID or a UE destination ID, whereas the cast type broadcast may be derived from a flag specified in the configuration of from the configuration that does not include any group destination ID or UE destination ID, i.e., the first part or first stage SCI is defined without any destination ID.

Thus, embodiments of the fourth aspect of the present invention provide for a first stage SCI design that allows for an implicit cast type identification combined with a destination ID. As described above, using the two stage SCI may enable the UE to derive from the information included in the first stage SCI whether the SCI is relevant for the UE or is intended for the UE, i.e., whether the UE expect a second part SCI or not. In case the second part is intended for the UE, the location and frequency/time domain of the second stage SCI plus the additional associated data may be provided as described above with reference to the first, second and third aspects of the present invention.

In accordance with embodiments, to enable a UE to derive from a first stage SCI its relevance for the UE, i.e., the relevance of an associated second stage SCI, a unique identification may be employed, for example, as described with reference to the third aspect, a cast type may be derived from a DMRS associated with the first stage SCI. In accordance with the fourth aspect, embodiments allow deriving the cast type from the source ID and/or the destination ID or from the absence of the source and destination IDs. The source ID identification works at least for unicast & groupcast. Source ID here refers to the originator of the unicast communication. If the UE is still in RRC_connected mode and experienced no radio link failure or handover, the source ID is used to identify the ongoing communication in the first stage. This saves the redundant information from being transmitted like a broadcast indicator. Source ID here refers to the originator of the groupcast communication (group-leader/group-head). If the UE is still in RRC_connected mode and experienced no radio link failure or handover then, source ID is used to identify the ongoing communication in the first stage. This saves the redundant information from being transmitted like broadcast indicator. This will be updated only if the group leader changes.

For example, a unicast or a groupcast may be derived from a group destination ID or a UE destination ID included in the first stage SCI. On the other hand, a broadcast may be derived from a flag or a bit included in the first stage SCI or from the absence of any destination ID in the first stage SCI, i.e., there is neither a group destination ID nor a UE destination ID included in the first stage SCI meaning that the communication is a broadcast. This may be achieved by sending a first stage SCI with a format which is reduced by removing the respective destination ID. In accordance with other embodiments, different formats for the first stage SCI may be provided, one with a destination ID and another one without a destination ID, the latter one indicating the broadcast.

Thus, in accordance with embodiments, a unicast communication may be identified by including a destination ID of the UE to which the unicast communication is directed into the first stage SCI. In accordance with further embodiments, a source ID may be used for identifying an ongoing unicast communication. Source ID here refers to the originator of the unicast communication. If the UE is still in RRC_connected mode and experienced no radio link failure or handover then, source ID is used to identify the ongoing communication in the first stage. This saves the redundant information from being transmitted like broadcast indicator.

In accordance with embodiments a groupcast communication may be identified by a plurality of destination IDs identifying the UEs involved in a groupcast communication, or by a group destination ID identifying the group of UEs involved in a groupcast communication. In accordance with other embodiments, the source ID may be used as an identification of a groupcast communication, for example in case the source ID is a group head of the group cast communication. Source ID here refers to the originator of the groupcast communication (group-leader/group-head). If the UE is still in RRC_connected mode and experienced no radio link failure or handover then, source ID is used to identify the ongoing communication in the first stage. This saves the redundant information from being transmitted like broadcast indicator. This will be updated only if the group leader changes. Note: This will not work in case of dynamic groups In accordance with embodiments, a broadcast may be identified by the absence of any destination UE ID or group destination ID, i.e., there is not any destination ID within the first stage SCI. For this, in accordance with embodiments, a further format of the first stage SCI may be employed that is free of the destination IDs. In accordance with other embodiments, a broadcast may be derived from a length of the first stage SCI that, when compared to a first stage SCI including destination IDs is shorter. In accordance with yet further embodiments, a broadcast specific ID may be employed, or a certain pattern or flag so as to identify the first stage SCI as being associated with a broadcast communication. In accordance with embodiments, this approach is used in case a destination ID is conveyed in the first SCI or it is scrambled with a CRC of the first stage CSI. In accordance with embodiments, a flag may be provided that indicates a broadcast or a non-broadcast.

The receiving UE may derive the information about the cast type implicitly from the received first stage SCI, more specifically from the missing group destination ID or missing UE destination ID or from a broadcast indicating flag.

In case a UE destination ID or a group destination ID is included in the first stage SCI, only the UEs for which the unicast communication or the groupcast communication is intended, i.e., a UE having a matching ID, reads or decodes the second stage SCI.

In accordance with embodiments, a broadcast ID may include multiple bits, for example 8 bits, in line with the group destination ID, or a 1 bit indication may be used for indicating broadcast, and the other bit fields may be used for other information.

In accordance with further embodiments, UE does not to expect, e.g., does not read or does not decode, the second part of the sidelink control message in case
 the first part of the sidelink control message includes a broadcast ID indicating a non-broadcast type of communication, like a broadcast flag or a broadcast bit, and does not include a UE ID, e.g., a UE destination ID, indicating, e.g., a unicast communication, or a group ID, e.g., a group destination ID, indicating, e.g., a groupcast communication or
 a UE ID or a group ID in the first part of the sidelink control message does not match an ID of the UE.

On the other hand, the UE may expect, e.g., read or decode, the second part of the sidelink control message in case the first part of the sidelink control message includes
 a UE ID or a group ID that matches an ID of the UE, or
 a broadcast ID indicating a broadcast type of communication, or does not include any type of ID.

In accordance with embodiments, the first part of the sidelink control message includes a broadcast ID and a UE or group ID so that, in case the broadcast ID indicates a broadcast type of communication, e.g., a broadcast flag is set to a first value, the UE determines the second part of the sidelink control message to be relevant for the UE, and is to expect, e.g., is to read or is to decode, the second part of the sidelink control message, and, in case the broadcast ID indicates a non-broadcast type of communication, e.g., a broadcast flag is set to a second value, the UE is to determine from the UE or group ID whether the second part is relevant UE, e.g., when the UE or group ID match an ID of the UE, and is to expect, e.g., is to read or is to decode, a relevant second part of the sidelink control message.

In accordance with further embodiments, the sidelink control message may be scrambled, e.g., using CRC scrambling, with a UE ID or a group ID or a broadcast ID. The UE does not expect, e.g., does not read or does not decode, the second part of the sidelink control message in case a descrambling yields one or more of:
 a broadcast ID indicating a non-broadcast type of communication, and the UE ID or a group ID does not match an ID of the UE, or
 a UE ID or a group ID does not match an ID of the UE, and
On the other hand, the UE may expect, e.g., read or decode, the second part of the sidelink control message in case the descrambling yields
 a UE ID or a group ID that matches an ID of the UE or
 a broadcast ID indicating a broadcast type of communication, or
 no ID.

In accordance with embodiments, the UE may derive, e.g., implicitly, a cast type from a UE ID or a group ID or a broadcast ID or an absence of any ID in the first part of the sidelink control message as follows:
 a broadcast in case of the absence of any ID or a broadcast ID set to broadcast in the first part of the sidelink control message,
 a groupcast in case of a groupcast ID or multiple UE IDs in the first part of the sidelink control message,
 a unicast in case of a unicast ID in the first part of the sidelink control message.

In accordance with other embodiments, a broadcast may be a single-stage broadcast, e.g., all information is included in a single message. In such embodiments, there is no second part of the sidelink control message, and the UE does not expect, e.g., does not read or does not decode, the second part of the sidelink control message in case the first part of the sidelink control message includes a broadcast ID indicating a broadcast type of communication.

General

Embodiments of the present invention have been described in detail above, and the respective embodiments and aspects may be implemented individually or two or more of the embodiments may be implemented in combination. It is noted that a UE may have multiple destination L1/L2 IDs and/or multiple source L1/L2 IDs depending on different transmission/receptions, e.g. unicast, groupcast and multicast.

Embodiments of the present invention have been described in detail above with reference to a sidelink communication using the PC5 interface. However, the present invention is not limited to the use of the PC5 interface. Any other interface allowing for a direct communication among one or more UEs may be employed, e.g., interfaces according to the IEEE 802.11p standard, the IEEE 802.15.4 standard (Zigbee), and others.

In some of the embodiments described above, reference has been made to respective vehicles being either in a mode in which SL resource allocation configuration or assistance is provided by a base station, e.g., the connected mode, also referred to as NR mode 1 or LTE mode 3 configuration, or vehicles being in a mode in which when no SL resource allocation configuration or assistance is provided by a base station, e.g., the idle mode, also referred to as NR mode 2 or LTE mode 4 configuration. However, the present invention is not limited to V2V communications or V2X communications, rather it is also applicable to any device-to-device communications, for example non-vehicular mobile users or stationary users that perform a sidelink communication, e.g., over the PC5 interface. Also, in such scenarios, the inventive aspects described above may be employed.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a receiver may comprise one or more of a mobile or stationary terminal, an IoT device, a ground-based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 21 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

| LIST OF ACRONYMS AND SYMBOLS | |
| --- | --- |
| V2X | Vehicle-to-Everything |
| 3GPP | Third Generation Partnership Project |
| D2D | Device-to-Device |
| ITS | Intelligent Transport Services |
| FR1, FR2 | Frequency Range Designations |
| BS | Base Station |
| eNB | Evolved Node B (3G base station) |
| UE | User Equipment |
| SL | Sidelink |

-continued

LIST OF ACRONYMS AND SYMBOLS

| | |
|---|---|
| V2V | Vehicle-to-Vehicle |
| SCS | Sub Carrier Spacing |
| RB | Resource Block |
| PSCCH | Physical Sidelink Control Channel |
| PSSCH | Physical Sidelink Shared Channel |
| TTI | Transmit Time Interval |
| SCI | Sidelink Control Information |
| DCI | Downlink Control Information |
| CP | Cyclic Prefix |
| BWP | Bandwidth Part |
| CORESET | Control Resource Set |
| USS | UE-Specific Search Space |
| CSS | Common Search Space |
| RP | Resource Pool |
| mRP | Mini Resource Pool |
| NR | New Radio |
| SLR | Service Level Requirements |
| CAM | Cooperative Awareness messages |
| PSSCH | Physical Sidelink Shared Channel |
| PSCCH | Physical Sidelink Control Channel |
| SCI | Sidelink Control Information |
| DENM | Decentralized Network messages |
| TPC | Transmit-power control |
| DMRS | Demodulation Reference Signals |
| S-RSRP | Sidelink - Received Signal Strength |
| QoS | Quality of Service |
| MCS | Modulation Coding Scheme |
| TBS | Transport Block Size |

REFERENCES

[1] 3GPP TS 36.213, "E-UTRA; Physical layer procedures (Release 15)", V15.6.0, June 2019
[2] 3GPP TS 36.211, "E-UTRA; Physical channels and modulation (Release 15)", V15.6.0, June 2019
[3] T. S. Rappaport, Wireless Communications, Prentice Hall, 2002
[4] RAN1 #97 Chairman's Notes Chairman's Notes, 3GPP TSG RAN WG1 #97, May 2019
[5] TR 38.885 3GPP TR 38.885, "NR Study on Vehicle-to-everything", V16.0.0, March 2019.
[6] R1-1907924 3GPP TDoc R1-1907924, "Feature lead summary #4 for 7.2.4.1 Physical layer structure for sidelink", Samsung, 3GPP RAN1 #97, May 2019
[7] RP-190984 3GPP TDoc RP-190984, "Revised WID on 5G V2X with NR sidelink", LG Electronics, Huawei, 3GPP RAN #84, June 2019.
[8] 3GPP TS 23.303, "Proximity-based services (ProSe); Stage 2 (Release 15)", V15.0.0, June 2017

The invention claimed is:

1. A user device, UE, for a wireless communication system, wherein the UE comprises:
one or more processors, wherein the one or more processors configure the UE to establish a sidelink communication with one or more further UEs in the wireless communication system, the sidelink communication comprising a first-stage sidelink control message and a second-stage sidelink control message to be transmitted on sidelink resources, wherein the one or more processors further configure the UE to identify the first-stage sidelink control message and the second-stage sidelink control message for the UE; and
to decode the first-stage sidelink control message for the UE to derive control information embedded in the first-stage sidelink control message, wherein the information embedded in the first-stage sidelink control message indicates time and frequency resources for the second-stage sidelink control message and a configuration of the second-stage sidelink control message,
wherein the information embedded in the first-stage sidelink control message includes a periodicity with which the first-stage sidelink control message and/or the second-stage sidelink control message are repeated, and wherein the periodicity is signaled or selected by a variable number of bits, wherein the variable number of bits represent an entry into a list of periodicities selected from a set of predefined periodicities, and wherein at least one of the predefined periodicities is a predefined value for the periodicity which signals a single-shot transmission of the first-stage sidelink control message and/or the second-stage sidelink control message without any periodicity.

2. The user device of claim 1, wherein the time and frequency resources for the first-stage sidelink control message and the time and frequency resources for the second-stage sidelink control message are one or more of
adjacent in time domain, or
non-adjacent in the time domain, with or without a time gap between the time and frequency resources for the first-stage sidelink control message and the time and frequency resources for the second-stage sidelink control message, or
adjacent in the frequency domain, or
non-adjacent in the frequency domain, or
in the same resource pool, or
in different resource pools.

3. The user device of claim 1, wherein the information embedded in the first-stage sidelink control message indicates one or more of
a number of symbols in the time domain,
whether a transmission is a unicast transmission, a groupcast transmission or a broadcast transmission,
indicates a time offset of the second-stage sidelink control message from the first-stage sidelink control message,
a pointer to a physical channel associated with the second-stage sidelink control message.

4. The user device of claim 1, wherein the information embedded in the first-stage sidelink control message indicates one or more of:
a priority of a transmission associated with the first-stage sidelink control message,
a new data indicator, NDI, or a retransmission indicator indicating whether a transmission associated with the first-stage sidelink control message comprises new data and is a retransmission,
a retransmission gap indicating whether a retransmission is a non-autonomous retransmission or that an autonomous retransmission is active with a configured retransmission gap,
a DMRS pattern for the second-stage sidelink control message,
a CDM group and/or ports for the second-stage sidelink control message and the sidelink data channel, like the PSSCH,
a timing advance indicator,
a reservation periodicity.

5. The user device of claim 1, wherein the UE is to derive from the information in the first-stage sidelink control message and/or the second-stage control message whether the sidelink control message is intended for the UE.

6. The user device of claim 1, comprising: one or more of a mobile terminal, or stationary terminal, or cellular IoT-UE, or a vehicular UE, or an IoT or narrowband IoT, NB-IoT, device, or a ground based vehicle, or an aerial vehicle, or a drone, or a moving base station, or a road side unit, or a building, or any other item or device provided with network connectivity enabling the item/device to communicate using the wireless communication network, or a base station comprising one or more of a macro cell base station, or a small cell base station, or a central unit of a base station, or a distributed unit of a base station, or a road side unit, or a UE, or a remote radio head, or an AMF, or an SMF, or a core network entity, or a network slice as in the NR or 5G core context, or any transmission/reception point, TRP, enabling an item or a device to communicate using the wireless communication network, the item or device being provided with network connectivity to communicate using the wireless communication network.

7. A network entity for a wireless communication system, the wireless communication comprising one or more user devices (UEs) to be connected to one or more further UEs for a sidelink communication with the one or more further UEs, the sidelink communication comprising a first-stage sidelink control message and a second-stage sidelink control message to be transmitted on sidelink resources, wherein the network entity comprises: one or more processors, wherein the one or more processors configure the network entity to signal to a receiving UE or a group of receiving UEs the first-stage sidelink control message, wherein information embedded in the first-stage sidelink control message indicates time and frequency resources for the second-stage sidelink control message and a configuration of the second-stage sidelink control message, wherein the information embedded in the first-stage sidelink control message includes a periodicity with which the first-stage sidelink control message and/or the second-stage sidelink control message are repeated, wherein the periodicity is signaled or selected by a variable number of bits, wherein the variable number of bits represent an entry into a list of periodicities selected from a set of predefined periodicities, and wherein at least one of the predefined periodicities is a predefined value for the periodicity which signals a single-shot transmission of the first-stage sidelink control message and/or the second-stage sidelink control message without any periodicity.

8. A wireless communication system comprising:

a user device (UE) comprising one or more processors, wherein the one or more processors configure the UE to establish a sidelink communication with one or more further UEs in the wireless communication system, the sidelink communication comprising a first-stage sidelink control message and a second-stage sidelink control message to be transmitted on sidelink resources, wherein the one or more processors further configure the UE to identify the first-stage sidelink control message and the second-stage sidelink control message for the UE; and to decode the first-stage sidelink control message for the UE to derive control information embedded in the first-stage sidelink control message, wherein the information embedded in the first-stage sidelink control message indicates time and frequency resources for the second-stage sidelink control message and a configuration of the second-stage sidelink control message, wherein the information embedded in the first-stage sidelink control message includes a periodicity with which the first-stage sidelink control message and/or the second-stage sidelink control message are repeated, wherein the periodicity is signaled or selected by a variable number of bits, wherein the variable number of bits represent an entry into a list of periodicities selected from a set of predefined periodicities, and wherein at least one of the predefined periodicities is a predefined value for the periodicity which signals a single-shot transmission of the first-stage sidelink control message and/or the second-stage sidelink control message without any periodicity, and/or a network entity comprising one or more processors, wherein the one or more processors configure the network entity to signal to a receiving UE or a group of receiving UEs a first-stage sidelink control message, wherein information embedded in the first-stage sidelink control message indicates time and frequency resources for the second-stage sidelink control message and a configuration of a second-stage sidelink control message, wherein the information embedded in the first-stage sidelink control message includes a periodicity with which the first-stage sidelink control message and/or the second-stage sidelink control message are repeated, wherein the periodicity is signaled or selected by a variable number of bits, wherein the variable number of bits represent an entry into a list of periodicities selected from a set of predefined periodicities, and wherein at least one of the predefined periodicities is a predefined value for the periodicity which signals a single-shot transmission of the first-stage sidelink control message and/or the second-stage sidelink control message without any periodicity.

9. The wireless communication system of claim 8, comprising one or more base stations, wherein the base station comprises one or more of a macro cell base station, or a small cell base station, or a central unit of a base station, or a distributed unit of a base station, or a road side unit, or a UE, or a remote radio head, or an AMF, or an SMF, or a core network entity, or a network slice as in the NR or 5G core context, or any transmission/reception point, TRP, enabling an item or a device to communicate using the wireless communication network, the item or device being provided with network connectivity to communicate using the wireless communication network.

10. A method for a wireless communication system, the method comprising: connecting a user device (UE) to one or more further UEs in the wireless communication system for a sidelink communication with the one or more further UEs, the sidelink communication comprising a first-stage sidelink control message and a second-stage sidelink control message to be transmitted on sidelink resources;

identifying, by the UE, a first-stage sidelink control message and the second-stage control message for the UE; and decoding, by the UE, the first-stage sidelink control message for the UE to derive control information embedded the first-stage sidelink control message, wherein the information embedded in the first-stage sidelink control message indicates time and frequency resources for the second-stage sidelink control message and a configuration of the second-stage sidelink control message, wherein the information embedded in the first-stage sidelink control message includes a periodicity with which the first-stage sidelink control message and/or the second-stage sidelink control message are repeated, wherein the periodicity is signaled or selected by a variable number of bits, wherein the variable number of bits represent an entry into a list of periodicities selected from a set of predefined periodicities, and wherein at least one of the predefined periodicities is a predefined value for the periodicity which signals a single-shot transmission of the first-stage sidelink control message and/or the second-stage sidelink control message without any periodicity.

11. A method for operating a wireless communication system, the wireless communication system comprising one or more user devices (UEs) to be connected to one or more further UEs for a sidelink communication with the one or more further UEs, the sidelink communication comprising a first-stage sidelink control message and a second-stage sidelink control message to be transmitted on sidelink resources, the method comprising:

signaling, by a network entity, to a receiving UE or a group of receiving UEs the first-stage sidelink control message, wherein information embedded in the first-stage sidelink control message indicates time and frequency resources for the second-stage sidelink control message and a configuration of the second-stage sidelink control message, wherein the information embedded in the first-stage sidelink control message includes a periodicity with which the first-stage sidelink control message and/or the second-stage sidelink control message are repeated, wherein the periodicity is signaled or selected by a variable number of bits, wherein the variable number of bits represent an entry into a list of periodicities selected from a set of predefined periodicities, and wherein at least one of the predefined periodicities is a predefined value for the periodicity which signals a single-shot transmission of the first-stage sidelink control message and/or the second-stage sidelink control message without any periodicity.

12. A non-transitory digital storage medium having a computer program stored thereon to perform, when the computer program is run by a computer, a method for operating a wireless communication system, the method comprising:

connecting a user device (UE) to one or more further UEs in the wireless communication system for a sidelink communication with the one or more further UEs, the sidelink communication comprising a first-stage sidelink control message and a second-stage sidelink control message to be transmitted on sidelink resources;

identifying, by the UE, the first-stage sidelink control message and the second-stage control message for the UE; and decoding, by the UE, the first-stage sidelink control message for the UE to derive control information embedded in the first-stage sidelink control message, wherein the information embedded in the first-stage sidelink control message indicates time and frequency resources for the second-stage sidelink control message and a configuration of the second-stage sidelink control message, wherein the information embedded in the first-stage sidelink control message includes a periodicity with which the first-stage sidelink control message and/or the second-stage sidelink control message are repeated, wherein the periodicity is signaled or selected by a variable number of bits, wherein the variable number of bits represent an entry into a list of periodicities selected from a set of predefined periodicities, and wherein at least one of the predefined periodicities is a predefined value for the periodicity which signals a single-shot transmission of the first-stage sidelink control message and/or the second-stage sidelink control message without any periodicity.

13. A non-transitory digital storage medium having a computer program stored thereon to perform, when the computer program is run by a computer, a method for operating a wireless communication system, the wireless communication comprising one or more user devices (UEs) to be connected to one or more further UEs for a sidelink communication with the one or more further UEs, the sidelink communication comprising a first-stage sidelink control message and a second-stage sidelink control message to be transmitted on sidelink resources, the method comprising: signaling, by a network entity, to a receiving UE or a group of receiving UEs the first-stage sidelink control message, wherein information embedded in the first-stage sidelink control message indicates time and frequency resources for the second-stage sidelink control message and a configuration of the second-stage sidelink control message, wherein the information embedded in the first-stage sidelink control message includes a periodicity with which the first-stage sidelink control message and/or the second-stage sidelink control message are repeated, wherein the periodicity is signaled or selected by a variable number of bits, wherein the variable number of bits represent an entry into a list of periodicities selected from a set of predefined periodicities, and wherein at least one of the predefined periodicities is a predefined value for the periodicity which signals a single-shot transmission of the first-stage sidelink control message and/or the second-stage sidelink control message without any periodicity.

\* \* \* \* \*